United States Patent
Masuno et al.

(10) Patent No.: US 7,412,470 B2
(45) Date of Patent: Aug. 12, 2008

(54) ARITHMETIC PROCESSING APPARATUS

(75) Inventors: Takashi Masuno, Hirakata (JP); Tatsuro Juri, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 738 days.

(21) Appl. No.: 10/935,193

(22) Filed: Sep. 8, 2004

(65) Prior Publication Data

US 2005/0086276 A1    Apr. 21, 2005

(30) Foreign Application Priority Data

Sep. 11, 2003    (JP)    ............................ 2003-320325

(51) Int. Cl.
*G06F 17/10* (2006.01)
*G06F 17/14* (2006.01)
*H04B 1/66* (2006.01)

(52) U.S. Cl. .................. 708/300; 708/402; 375/240.01

(58) Field of Classification Search ................. 708/402, 708/524, 300, 319, 320; 375/240.01, 240.16
See application file for complete search history.

(56) References Cited

U.S. PATENT DOCUMENTS 5,790,712 A * 8/1998 Fandrianto et al. .......... 382/276

6,757,019 B1 * 6/2004 Hsieh et al. .................. 348/302

FOREIGN PATENT DOCUMENTS

| JP | 7-264583 | 10/1995 |
| JP | 10-083388 | 3/1998 |
| JP | 2001-084242 | 3/2001 |

* cited by examiner

*Primary Examiner*—Chuong D Ngo
(74) *Attorney, Agent, or Firm*—Wenderoth, Lind & Ponack, L.L.P.

(57) ABSTRACT

The arithmetic processing apparatus of the present invention is an arithmetic processing apparatus that can be reconfigured in accordance with a processing mode and has a plurality of arranged unit arithmetic circuits. Each unit arithmetic circuit includes at least one input terminal, at least one output terminal, a first register which holds data, an adder which calculates a sum of two pieces of data, a second register which holds data, a bit shifter which shifts data left or right, a subtractor which calculates a difference between two pieces of data, an absolute value calculating unit which calculates an absolute value of data, and a path setting unit which sets a path according to the processing mode connecting among these circuit elements.

22 Claims, 26 Drawing Sheets

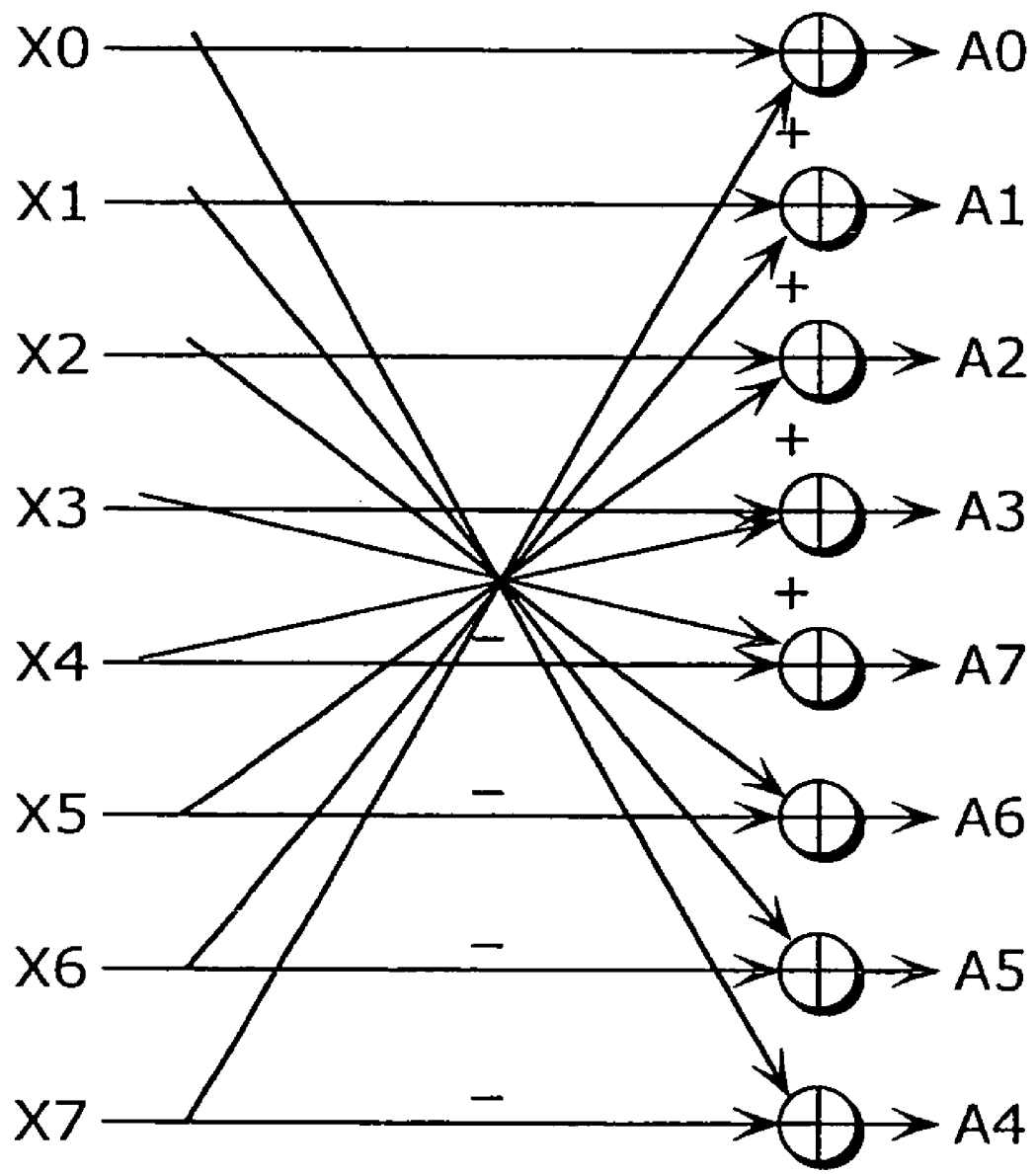

FIG. 11

| Output Data of Register | CLK0 | CLK1 | CLK2 | CLK3 | CLK4 | CLK5 |
|---|---|---|---|---|---|---|
| Reg16_12 | | | d0×1 | d1×1 | d2×1 | d3×1 | d4×1 |
| Reg16_13 | | | d0×1 | d1×1<br>+d0×1 | d2×1<br>+d1×1 | d3×1<br>+d2×1 | d4×1<br>+d3×1 |
| Reg16_14 | | | d0×2 | d1×2<br>+d0×1 | d2×2<br>+d1×1 | d3×2<br>+d2×1 | d4×2<br>+d3×1 |
| Reg73 | | | d0×1 | d1×1<br>+d0×2 | d2×1<br>+d1×2<br>+d0×1 | d3×1<br>+d1×2<br>+d0×1 | d4×1<br>+d3×2<br>+d2×1<br>+d1×1 |
| Reg16_22 | | | 0 | 0 | 0 | 0 | 0 |
| Reg16_23 | | | d0×1 | d1×1<br>+0 | d2×1<br>+0 | d3×1<br>+0 | d4×1<br>+0 |
| Reg16_24 | | | d0×2 | d1×2<br>+d0×1 | d2×2<br>+d1×1 | d3×2<br>+d2×1<br>+0 | d4×2<br>+d3×1<br>+0 |
| Reg74 | | | 0 | 0<br>+d0×2 | 0<br>+d1×2<br>+d0×1 | 0<br>+d2×2<br>+d1×1 | 0<br>+d3×2<br>+d2×1 |
| Reg76 | | | d0 | d0*4<br>+d1 | d0*2<br>+d1*4<br>+d2 | d3<br>+d2*4<br>+d1*2<br>+d0 | d4<br>+d3*4<br>+d2*2<br>+d1 |
| Data out | | | d0/8 | d0/2<br>+d1/8 | d0/4<br>+d1/2<br>+d2/8 | d3/8<br>+d2/2<br>+d1/4<br>+d0/8 | d4/8<br>+d3/2<br>+d2/4<br>+d1/8 |

FIG. 15A

| Output Data of First Register | CLK0 | CLK1 | CLK2 | CLK3 | CLK4 |
|---|---|---|---|---|---|
| Reg0_0 | SAD000 | SAD001 | SAD002 | SAD003 | SAD004 |
| Reg0_0 | | SAD101<br>+SAD000 | SAD102<br>+SAD001 | SAD103<br>+SAD002 | SAD104<br>+SAD003 |
| Reg0_2 | | | SAD202<br>+SAD101<br>+SAD000 | SAD203<br>+SAD102<br>+SAD001 | SAD204<br>+SAD103<br>+SAD002 |
| Reg0_3 | | | | SAD303<br>+SAD202<br>+SAD101<br>+SAD000 | SAD304<br>+SAD203<br>+SAD102<br>+SAD001 |

FIG. 15B

| Output Data of First Register | CLK0 | CLK1 | CLK2 | CLK3 | CLK4 |
|---|---|---|---|---|---|
| Reg1_0 | SAD010 | SAD011 | SAD012 | SAD013 | SAD014 |
| Reg1_1 | | SAD111 +SAD010 | SAD112 +SAD011 | SAD113 +SAD012 | SAD114 +SAD013 |
| Reg1_2 | | | SAD212 +SAD111 +SAD010 | SAD213 +SAD112 +SAD011 | SAD214 +SAD113 +SAD012 |
| Reg1_3 | | | | SAD313 +SAD212 +SAD111 +SAD010 | SAD314 +SAD213 +SAD112 +SAD011 |

FIG. 15C

| Output Data of First Register | CLK0 | CLK1 | CLK2 | CLK3 | CLK4 |
|---|---|---|---|---|---|
| Reg2_0 | SAD020 | SAD021 | SAD022 | SAD023 | SAD024 |
| Reg2_1 | | SAD121<br>+SAD020 | SAD122<br>+SAD021 | SAD123<br>+SAD022 | SAD124<br>+SAD023 |
| Reg2_2 | | | SAD222<br>+SAD121<br>+SAD020 | SAD223<br>+SAD122<br>+SAD021 | SAD224<br>+SAD123<br>+SAD022 |
| Reg2_3 | | | | SAD323<br>+SAD222<br>+SAD121<br>+SAD020 | SAD324<br>+SAD223<br>+SAD122<br>+SAD021 |

FIG. 15D

| Output Data of First Register | CLK0 | CLK1 | CLK2 | CLK3 | CLK4 |
|---|---|---|---|---|---|
| Reg3_0 | SAD030 | SAD031 | SAD032 | SAD033 | SAD034 |
| Reg3_1 | | SAD131<br>+SAD030 | SAD132<br>+SAD031 | SAD133<br>+SAD032 | SAD134<br>+SAD033 |
| Reg3_2 | | | SAD232<br>+SAD131<br>+SAD030 | SAD233<br>+SAD132<br>+SAD031 | SAD234<br>+SAD133<br>+SAD032 |
| Reg3_3 | | | | SAD333<br>+SAD232<br>+SAD131<br>+SAD030 | SAD334<br>+SAD233<br>+SAD132<br>+SAD031 |

ARITHMETIC PROCESSING APPARATUS

BACKGROUND OF THE INVENTION (1) Field of the Invention

The present invention relates to an arithmetic processing apparatus, in particular to an arithmetic processing apparatus that has an encoder which is applicable to both of a Moving Picture Experts Group (MPEG) which is a coding standard of moving picture data and a Joint Photographic Experts Group (JPEG) which is a coding standard of still picture data, the encoder having a Motion Estimation (hereafter referred to as ME) circuit, a Discrete Cosine Transform (hereafter referred to as DCT) circuit, a digital filter and the like.

(2) Description of the Related Art

For instance, an encoder which applies to both MPEG and JPEG standards (hereafter referred to as MPEG/JPEG encoder) is build in a conventional digital still camera (hereafter referred to as DSC) having a function of shooting moving pictures.

The conventional MPEG/JPEG encoder needs, in MPEG processing, a high-performance ME circuit in order to detects a direction and size of a motion vector inside a frame and inter-frames of the moving picture data. Thus, an ME operation becomes dominant compared to a DCT operation in MPEG processing. In JPEG processing for a mega pixel class, it needs a DCT circuit having a higher processing capability than that of the DCT circuit used in the MPEG processing so that a DCT operation becomes dominant. Furthermore, it needs a digital filter as a common circuit for MPEG processing and JPEG processing.

FIG. 1 is a block diagram showing an example of a configuration of a DSC having the MPEG/JPEG encoder. In FIG. 1, 1901 shows an optical unit constituted of optical components such as lens. An optical signal from a subject to be imaged is, via the optical unit 1901, inputted to an image sensor 1902 such as CCD and converted into an electric signal. 1903 shows an analog signal processing/timing signal generating unit. The timing signal generating unit (TG) generates a timing signal which drives the image sensor 1902. The analog signal processing unit 1903 performs, on the analog signal from the image sensor 1902, processing such as correlated double sampling (CDS), automatic gain control (AGC) and A/D conversion, and converts it to a digital image data. The picture data calculated as described above is stored into a memory 1905 via a memory controller 1904.

The picture data stored in the memory 1905 is inputted to a MPEG/JPEG encoder 1906 via the memory controller 1904. The MPEG/JPEG encoder 1906 encodes, when the picture data stored in the memory 1905 is moving picture data, the inputted picture data by the MPEG processing circuit. The MPEG processing circuit performs coding by a motion compensation inter-frame prediction coding using a temporal correlation, the DCT using a Distributed Arithmetic (hereafter referred to as DA) method as an orthogonal coding using a spatial correlation, a quantization which weights coefficients not to assign a code to coefficients in high-frequency which has lesser visual effects in order to suppress an amount of coding generation, and a Huffman coding as an entropy coding (variable length coding) for assigning a shorter code stream to a coefficient with high generation probability using a bias of the generation probability (generation ratio).

On the other hand, when the picture data stored in the memory 1905 is still picture data, the MPEG/JPEG encoder 1906 encodes the inputted still picture data using the JPEG processing circuit which performs coding by the DCT using the DA method, quantization and Huffman coding.

The coded data sent from the MPEG/JPEG encoder 1906 is stored into the memory 1905, or is written into a memory card 1908 via a memory card interface (I/F) 1907. Note that a CPU 1909 which controls the analog signal processing/timing signal generating unit 1903, the MPEG/JPEG encoder 1906 and the memory card I/F 1907.

As described above, in the MPEG processing circuit inside the MPEG/JPEG encoder 1906, the ME circuit is included for performing motion compensated interframe prediction coding. The ME circuit searches, for instance per macroblock of 16×16 pixels, whether or not a similar picture data exists in a coded frame.

It is assumed that the ME circuit, for instance when it searches all of one frame whose picture size is 640×480 pixels (40×30 macroblock), performs Sum of Absolute Differences (hereafter referred to as SAD) operations of 16×16 pixels while shifting 640 pixels in a horizontal direction and 480 lines in a vertical direction. In this case, one SAD operation needs, for one macroblock, 256 times of the subtract operation and 256 times of add operation for calculating a sum. That is, the total of 512 times of add-subtract processing is needed. Thus, 512×640×480×40×30=188743680000 times, about 1887 billion times of add-subtract processing are performed for one frame.

Furthermore, when two thirds of 30 frames per second of the picture data to be processed are two bi-predictive coded B pictures, the ME circuit needs vast number of arithmetic processing as many as 188 billion×30×5/3=94371 billion times per second. This becomes a factor of determining an amount of arithmetic processing (circuit scale, power consumption) in the MPEG processing circuit.

Also, as described above, the DCT circuit for performing spatial redundant compression is included in the JPEG processing circuit inside the MPEG/JPEG encoder 1906. The DCT circuit splits two-dimensional pixel data (YUV data) into blocks each having 8×8 pixels and performs one-dimensional DCT in horizontal and vertical directions.

The number of blocks for which the DCT circuit has to perform, on pixel data in 3 million pixel class sent from the CCD as an image sensor, arithmetic processing by a continuous exposure mode for 4 frame per second is 3 million×4/(8×8)≈0.187500 per second. Further, in order to calculate a preset coding amount, when quantization matrix is adjusted and the arithmetic processing is redone after the side DCT, the number of blocks for which the arithmetic processing is performed is 187500×2=375000.

The DCT circuit is also included in the MPEG processing circuit. However, even if the picture size is 64×480 pixels and 30 frames per second, the number of blocks for which the DCT circuit performs the arithmetic processing is 640×480×30/(8×8)≈144000 per second.

Accordingly, the DCT circuit included in the JPEG processing circuit needs an amount of the arithmetic processing which is 2.5 times or more of that of the DCT circuit in the MPEG processing circuit. This becomes a factor of determining the amount of the arithmetic processing (circuit scale, power consumption) in the JPEG processing circuit.

The conventional technology is, for instance, disclosed in Japanese-Laid Open Patent Application No. 2001-84242, Japanese-Laid Open Patent Application No. H7-264583, Japanese-Laid Open Patent Application No. H10-83388 and the like.

As described above, the conventional MPEG/JPEG encoder needs a high-performance ME circuit for the MPEG processing and needs a high-processing performance DCT circuit for the JPEG processing but it cannot mutually use both circuits for the MPEG processing and the JPEG processing. Thus, the conventional MPEG/JPEG encoder has a problem that each circuit is separately set so that a circuit scale is enlarged and the power consumption is increased.

SUMMARY OF THE INVENTION

It is an object of the present invention to provide an arithmetic processing apparatus which can obtain necessary processing performance using a simple structure without any waste, minimize a scale of a circuit for each processing performance compared to a Digital Signal Processor (DSP), and seeks low power consumption.

In order to achieve the above objective, the present invention is an arithmetic processing apparatus that can be reconfigured in accordance with a processing mode, comprising a plurality of arranged unit arithmetic circuits, wherein each of said unit arithmetic circuits includes: at least one input terminal; at least one output terminal; a first register that holds data; an adder operable to add two pieces of data; a second register that holds data; a bit shifter operable to shift data to one of left and right; a subtractor operable to calculate a difference between two pieces of data; an absolute value calculating unit operable to calculate an absolute value of data; and a path setting unit operable to set a connection path according to the processing mode, the connection path connecting among the input terminal, the output terminal, the first register, the adder, the second register, the bit shifter, the subtractor, and the absolute value calculating unit.

Here, combinations of unit arithmetic circuits may form a plurality of arithmetic processing blocks, and the plurality of arithmetic processing blocks respectively have a unique arithmetic processing function and said arithmetic processing function differs depending on the processing mode.

Here, the plurality of arithmetic processing blocks include first and second arithmetic processing blocks when the processing mode is a coding mode for a still picture, the first arithmetic processing block has a partial function for a discrete cosine transform processing using a distributed arithmetic method, and the second arithmetic processing block has a digital filtering function.

Here, the plurality of arithmetic processing blocks include first, second and third arithmetic processing blocks when the processing mode is a coding mode for a moving picture using a correlation between moving picture frames, the first arithmetic processing block has a motion estimation function for a motion compensation interframe prediction coding, the second arithmetic processing block has a partial function for a discrete cosine transform processing using a distributed arithmetic method, and the third arithmetic processing block has a digital filtering function.

Accordingly, this structure can be reconfigured in accordance with the processing mode. Therefore, it is not necessary to realize different arithmetic processing using a separate circuit so that circuit scale can be minimized and the power consumption can be reduced. In particular, each unit arithmetic circuit can be reconfigured by switching the MPEG processing circuit and the JPEG processing circuit since it has the input terminal, the output terminal, the first register, the adder, the second register, the bit shifter, the subtractor, and the absolute value calculating unit. As the result, the arithmetic processing apparatus can obtain necessary processing performance for DSP using a simple configuration without any wastes, minimize the circuit scale for each processing performance compared to DSP and seeks low power consumption.

Also, in order to achieve the above objective, the arithmetic processing apparatus according to the present invention that can be reconfigured in accordance with a processing mode, comprising an arranged plurality of unit arithmetic circuits, wherein each of the plurality of unit arithmetic circuits includes: first and second input terminals; third and fourth input terminals; a first register operable to hold picture data inputted from the first input terminal in synchronization with a clock signal; a first selector operable to select and output, according to the processing mode, one of picture data inputted from the second input terminal and picture data inputted from the third input terminal; an adder having a first input port and a second input port operable to i) add picture data outputted from the first register and inputted to the first input port and picture data inputted to the second input port and ii) output to a first output terminal; a second register operable to hold the picture data outputted from the first selector in synchronization with the clock signal; a second selector operable to select and output, according to the processing mode, one of the picture data outputted from the first register, the picture data outputted from the second register, the picture data inputted from the third input terminal, and fixed data; a bit shifter operable to shift the picture data outputted from the second register as many as a number of set bits to one of upper side and a lower side; a subtractor operable to i) calculate a difference between the picture data outputted from the bit shifter and one of the picture data outputted from the second selector and the fixed data and ii) output the difference to a second output terminal; an absolute value calculating unit operable to calculate an absolute value of the difference data outputted from the subtractor; and a third selector operable to i) select, according to the processing mode, one of the picture data outputted from the second register, the difference data outputted from the subtractor, and the absolute value data outputted from the absolute value calculating unit and ii) output the selected data to the second input port of the adder, combinations of unit arithmetic circuits form a plurality of arithmetic processing blocks, and executes for each of the plurality of arithmetic processing blocks an arithmetic processing function and the arithmetic processing function differs depending on the processing mode, said each one of the arithmetic processing function of said each of the plurality of arithmetic processing blocks being different from each other.

In the arithmetic processing apparatus according to the present invention, the processing mode is a coding mode for a still picture, and the plurality of arithmetic processing blocks include first and second arithmetic processing blocks, the first arithmetic processing block has a partial function for a discrete cosine transform processing using a distributed arithmetic method, and the second arithmetic processing block has a digital filtering function.

In this case, the arithmetic processing block executing a partial function of a discrete cosine transform processing constitutes a butterfly arithmetic circuit.

Also, in the arithmetic processing apparatus according to the present invention, the processing mode is a coding mode for a moving picture using a correlation between moving picture frames, wherein each of the plurality of arithmetic processing blocks executes a motion estimation function for a motion compensation interframe prediction coding, a partial function for a discrete cosine transform processing using a distributed arithmetic method, and a digital filtering function.

In this case, the arithmetic processing block which executes a partial function of the discrete cosine transform processing constitutes a butterfly arithmetic circuit and the arithmetic processing block constitutes an arithmetic circuit which calculates a sum of difference absolute values.

Also, the first selector selects picture data inputted from lower bits of the second input terminal, the second selector selects inputted from upper bits of the first register, the third selector selects the picture data inputted from the second register, and the bit shifter outputs with 0 bit shift. Therefore, the unit arithmetic circuit corresponding to the discrete cosine transform processing is reconfigured.

Furthermore, the first selector selects picture data to be compared that is inputted from the second input terminal, the second selector selects picture data for reference that is inputted from the third input terminal, the third selector selects absolute value data outputted from the absolute value calculating unit, and the bit shifter outputs with 0 bit shift. Therefore, the unit arithmetic circuit corresponding to the motion estimation processing is reconfigured.

Further, the arithmetic processing block which executes the partial function of the motion estimation processing has as many number of the unit arithmetic circuits arranged in a row direction as a number of pixels on which a motion estimation is performed, and picture data for reference is inputted while shifting a position in a column direction.

Also, the plurality of the first arithmetic processing blocks are arranged in parallel in the row direction, and it is preferred that the picture data for reference which is shifted by one pixel each in the column direction is inputted into the plurality of first arithmetic processing blocks.

Further, the arithmetic processing block which executes the motion estimation processing function has a plurality of modules that are arranged in parallel in the row direction, each of the plurality of modules is constituted by connecting as many said unit arithmetic circuits as a number of pixels in the column direction, pixel data for reference which constitutes the picture data for reference is commonly inputted to the third input terminals in the plurality of modules, and the first input terminals in the plurality of modules are connected to a first output of an adjacent unit arithmetic circuit.

Furthermore, the arithmetic processing block which executes the digital filtering processing function constitutes an arithmetic circuit, the said arithmetic circuit, in synchronization with a clock signal, i) shifting input picture data, in order to multiply the input picture data by a coefficient of n-th power of 2 (n is an integer), to an upper bit side when a sign of n is positive and to a lower bit side when a sign of n is negative as many as a number of bits of the absolute value of n, and ii) sequentially adding the shifted input picture data.

In this case, the arithmetic processing block which executes the digital filtering processing function connects each of the unit arithmetic circuits commonly to the third input terminal, wherein in the unit arithmetic circuit, the first selector selects the picture data inputted from the first selector, the second selector selects the fixed data and the third selector selects picture data inputted from the subtractor, and a plurality of modules that are arranged in parallel in a row direction, each of the plurality of modules has as many unit arithmetic circuits connected in a column direction as taps by connecting, in a column direction, each first output terminal in the unit arithmetic circuit group to a first input terminal of a unit arithmetic circuit that is arranged next in the column direction, each output data from each of the arranged modules in parallel are added by the adder via the first and second registers, and the added picture data is further digital filtered via a second register and a bit shifter in the other unit arithmetic circuit.

As described above, the arithmetic processing apparatus of the present invention can obtain necessary processing performance using a simple configuration without any waste, minimize the scale of a circuit for each processing performance compared to DSP, and seeks low power consumption.

The disclosure of Japanese Patent Application No. 2003-320325 filed on Sep. 11, 2003, is incorporated herein by reference.

BRIEF DESCRIPTION OF THE DRAWINGS

These and other objects, advantages and features of the invention will become apparent from the following description thereof taken in conjunction with the accompanying drawings that illustrate a specific embodiment of the invention.

In the drawings:

FIG. 7B is a diagram showing a simplification of the configuration shown in FIG. 7A.

FIG. 11 is a diagram showing changes of synchronizing output data (Reg) of each register shown in FIG. 10 with a clock signal CLK of output data (Data out) of a bit shifter 77.

FIG. 15A is a diagram showing changes of synchronizing output data Reg0_0, Reg0_1, Reg0_2 and Reg0_3 of each first register in the first module shown in FIG. 13 with clock signals CLK.

FIG. 15B is a diagram showing changes of synchronizing output data Reg1_0, Reg1_1, Reg1_2 and Reg1_3 of each first register in the second module shown in FIG. 13 with clock signals CLK.

FIG. 15C is a diagram showing changes of synchronizing output data Reg2_0, Reg2_1, Reg2_2 and Reg2_3 of each first register in the third module shown in FIG. 13 with clock signals CLK.

FIG. 15D is a diagram showing changes of synchronizing output data Reg3_0, Reg3_1, Reg3_2 and Reg3_3 of each first register in the third module shown in FIG. 13 with clock signals CLK.

DESCRIPTION OF THE PREFERRED EMBODIMENT

Hereafter, a preferred embodiment of the present invention is described with reference to the drawings. Here, an arithmetic processing apparatus in the present embodiment is applied to the MPEG/JPEG encoder of the DSC explained in the description of the related art with reference to FIG. 1.

Figure 2:
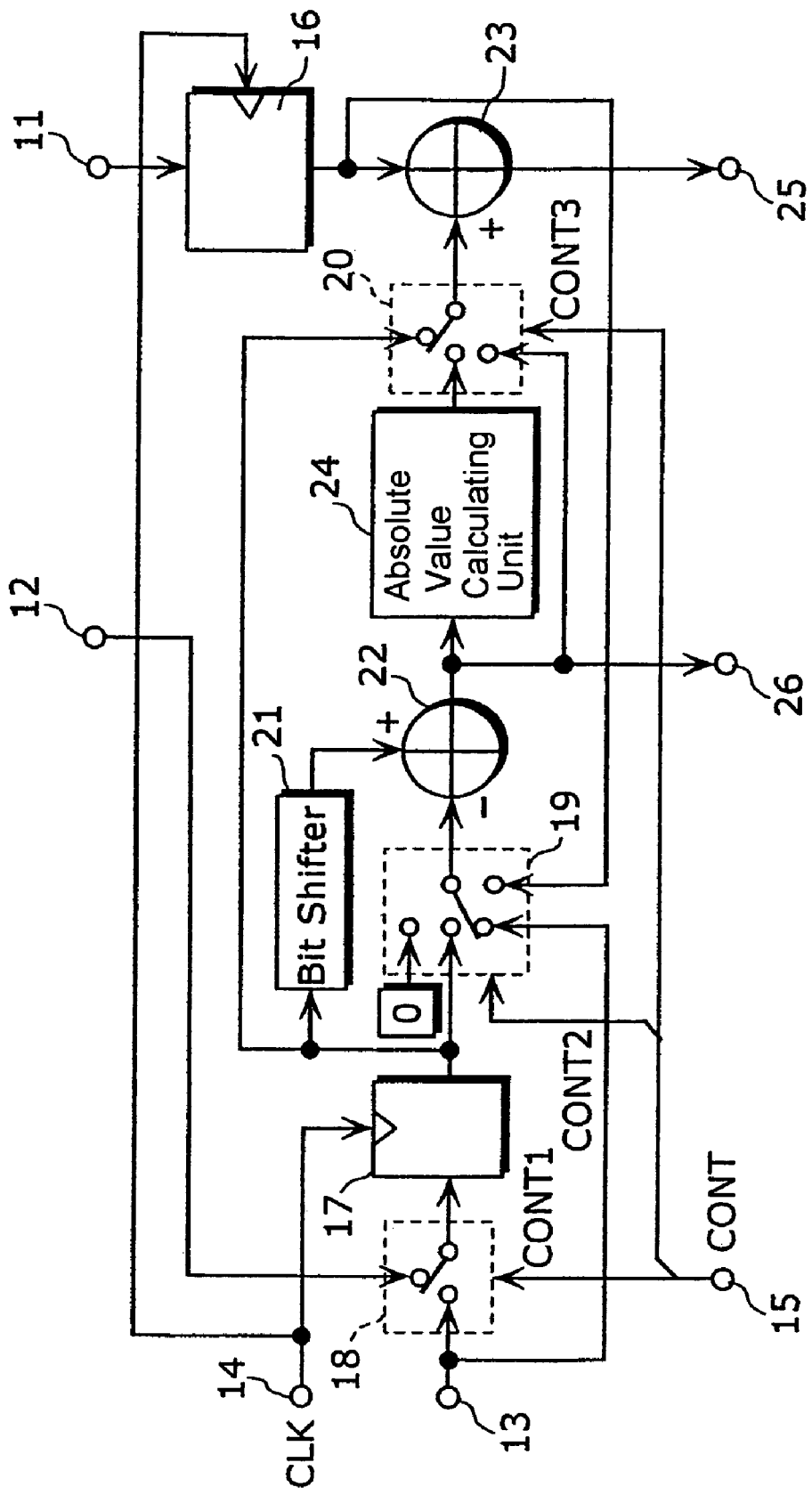
FIG. 2 is a circuit block diagram showing an example of a configuration of a unit arithmetic circuit in the arithmetic processing apparatus according to the first embodiment of the present invention.

FIG. 2 is a circuit block diagram showing an example of a configuration of a unit arithmetic circuit in the arithmetic processing apparatus according to the embodiment of the present invention. In FIG. 2, the unit arithmetic circuit has a first input terminal 11, a second input terminal 12, a third input terminal 13, a clock signal (CLK) input terminal 14, a control signal (CONT) input terminal 15, a first register 16, a second register 17, a first selector 18, a second selector 19, a third selector 20, a bit shifter 21, a subtractor 22, an adder 23, an absolute value calculating unit 24, a first output terminal 25 and a second output terminal 26.

The first register 16 holds picture data inputted from the first input terminal 11 in synchronization with the clock signal CLK. The first selector 18 selects and outputs the picture data inputted from the second input terminal 12 or the picture data inputted from the third input terminal 13 according to the first control signal (CONT1) corresponding to a processing mode adhering to the MPEG or JPEG standards.

The second register 17 holds the picture data outputted from the first selector 18 in synchronization with the clock signal CLK. The second selector 19 selects and outputs the picture data outputted from the first register 16, the picture data outputted from the second register 17, the picture data inputted from the third input terminal 13 or "0" which is fixed data according to a second control signal CONT2 corresponding to the processing mode adhering to the MPEG or JPEG standards.

The bit shifter 21 shifts the picture data outputted from the second register 17 to the upper side or the lower side as many as a set number of bits. The subtractor 22 calculates a difference between the picture data outputted from the bit shifter 21 and the picture data outputted from the second selector 19 or the fixed data and outputs the difference to the second output terminal 26.

The absolute value calculating unit 24 calculates an absolute value of the difference data outputted from the subtractor 22. The third selector 20 selects and outputs the picture data outputted from the second register 17, the difference data outputted from the subtractor 22 or the absolute value data outputted from the absolute value calculating unit 24 according to a third control signal CONT3 corresponding to the processing mode adhering to the MPEG or JPEG standards. The adder 23 adds the picture data outputted from the first register 16 and the picture data outputted from the third selector 20 and outputs the sum to the first output terminal 25.

As described above, the unit arithmetic circuit switches an arithmetic path using the first selector 18, the second selector 19 and the third selector 20 according to the JPEG processing mode when the targeted picture data is still picture data or according to the MPEG processing mode when the targeted picture data is moving picture data. Here, the first selector 18, the second selector 19 and the third selector 20 have a function of setting a connecting path according to the processing mode among, in the unit arithmetic circuit, the first input terminal 11, the second input terminal 12, the third input terminal 13, the clock signal (CLK) input terminal 14, the control signal (CONT) input terminal 15, the first register 16, the second register 17, the bit shifter 21, the subtractor 22, the adder 23, the absolute value calculating unit 24, the first output terminal 25, and the second output terminal 26. Accordingly, the unit arithmetic circuit constitutes a part of a butterfly arithmetic circuit included in the DCT circuit using the DA method and a part of the digital filter that are necessary for JPEG processing, and constitutes a part of the SAD arithmetic circuit that forms the ME circuit, a part of the butterfly arithmetic circuit included in the DCT circuit using the DA method and a part of the digital filter that are necessary for MPEG processing.

Figure 3A:
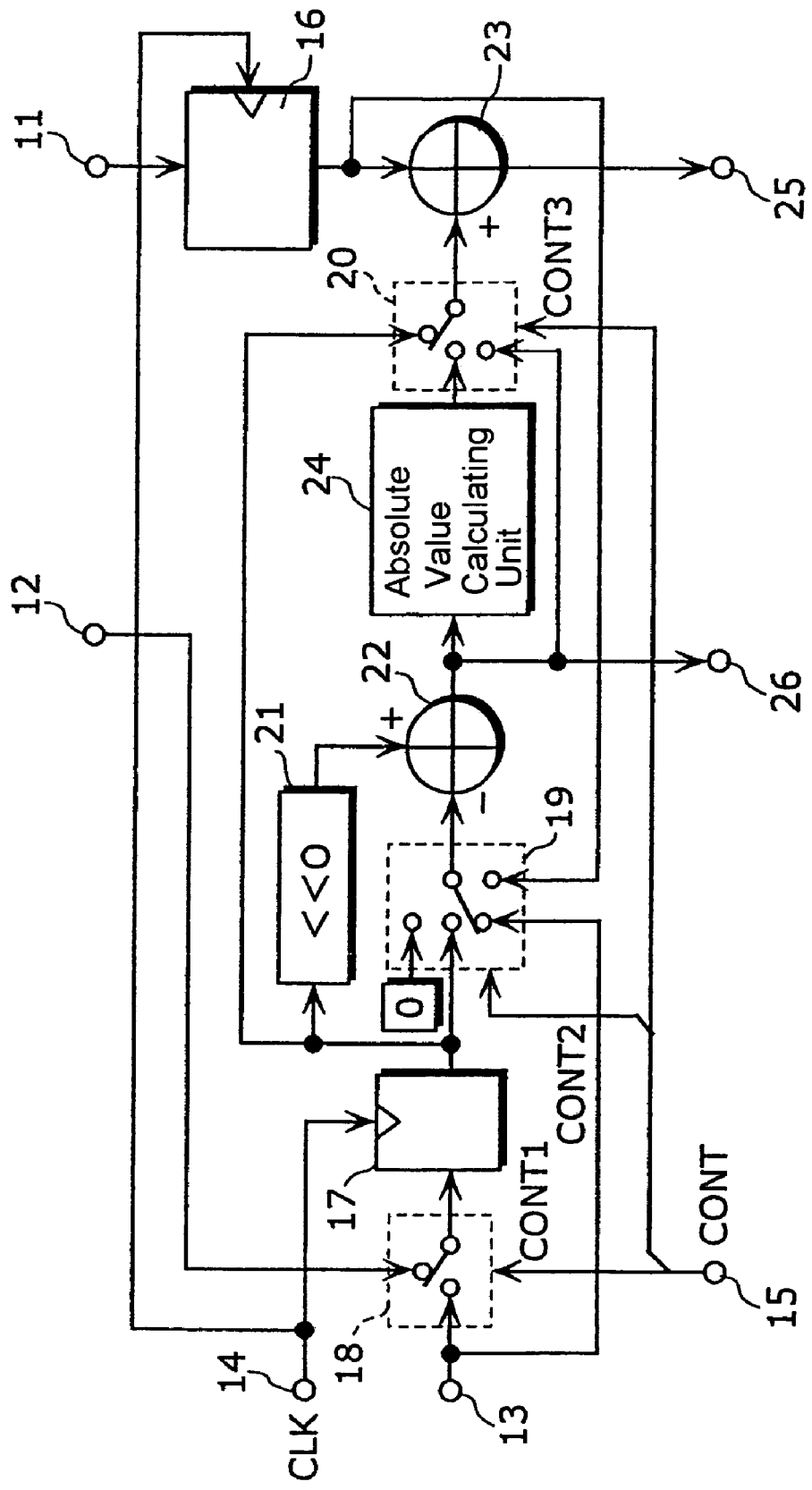
FIG. 3A is a diagram showing a circuit block diagram showing a state of switching an arithmetic path by first to third selectors in the unit arithmetic circuit which constitutes a part of a butterfly arithmetic circuit.
Figure 3B:
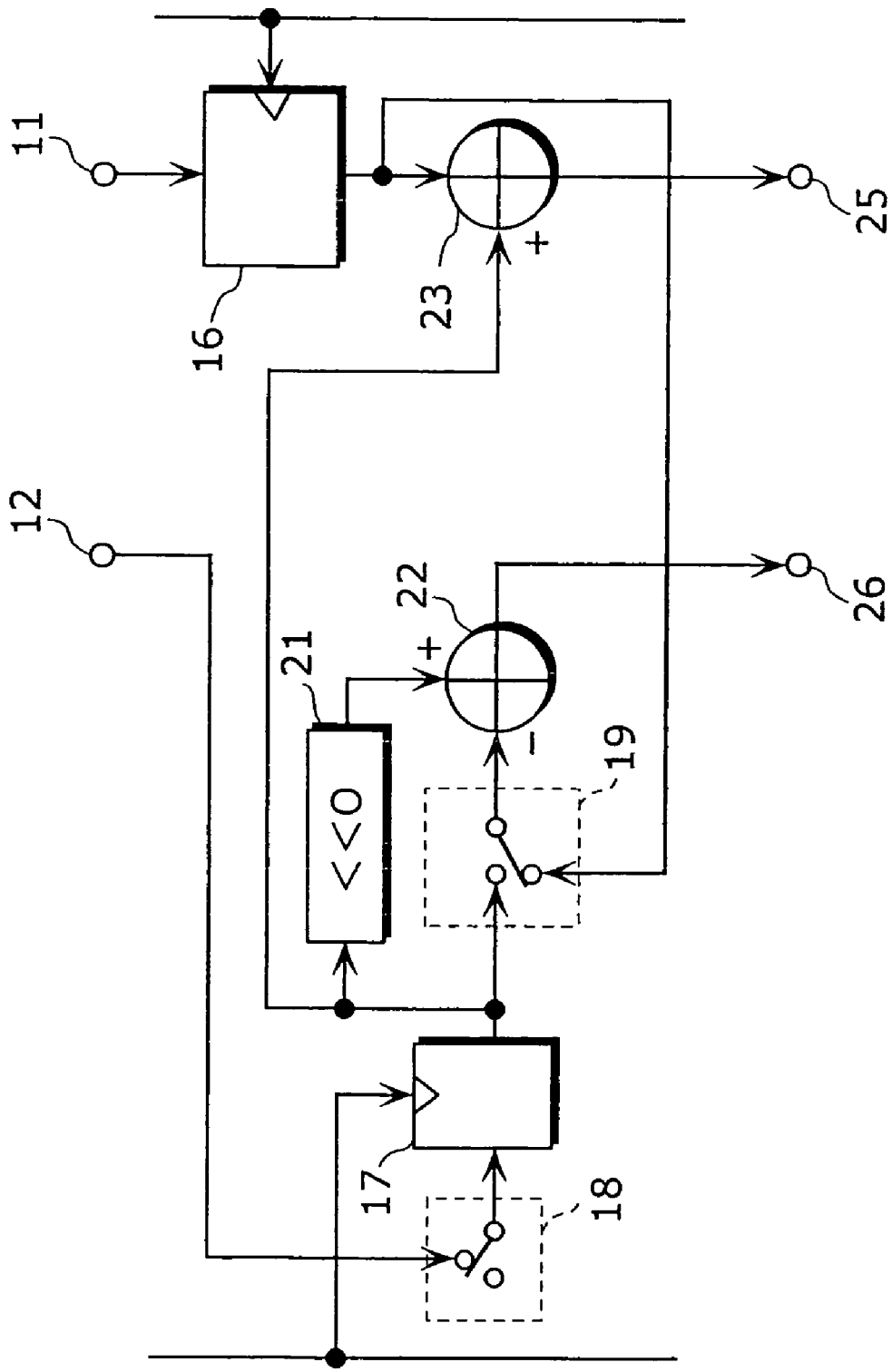
FIG. 3B is a diagram showing a simplification of the configuration shown in FIG. 3A.

FIG. 3A is a circuit block diagram showing a state of switching an arithmetic path by the first selector 18, the second selector 19 and the third selector 20 in the unit arithmetic circuit which constitutes a part of the butterfly arithmetic circuit. FIG. 3B is a diagram showing a simplification of the configuration shown in FIG. 3A. In FIG. 3A, when the unit arithmetic circuits form the butterfly arithmetic circuit, the first selector 18 selects picture data inputted from lower bits of the second input terminal 12. The second selector 19 selects picture data inputted from upper bits of the first register 16. The third selector 20 selects picture data inputted from the second register 17. The bit shifter 21 outputs through picture data (which does not shift bits) with 0 bit shift (described as "<<0").

Figure 4A:
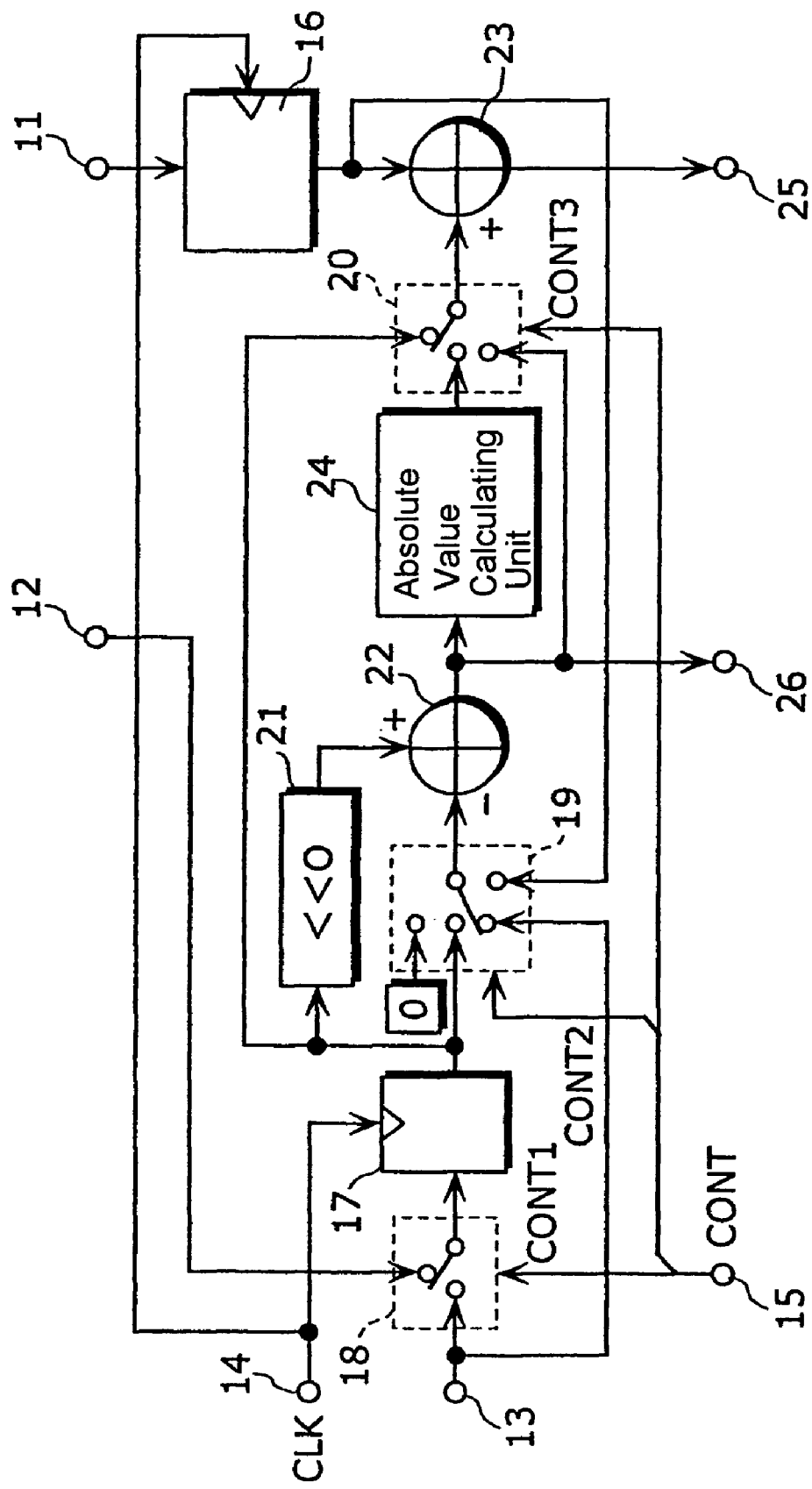
FIG. 4A is a circuit block diagram showing a state of switching an arithmetic path by the first to third selectors in the unit arithmetic circuit which constitutes a part of a SAD arithmetic circuit.
Figure 4B:
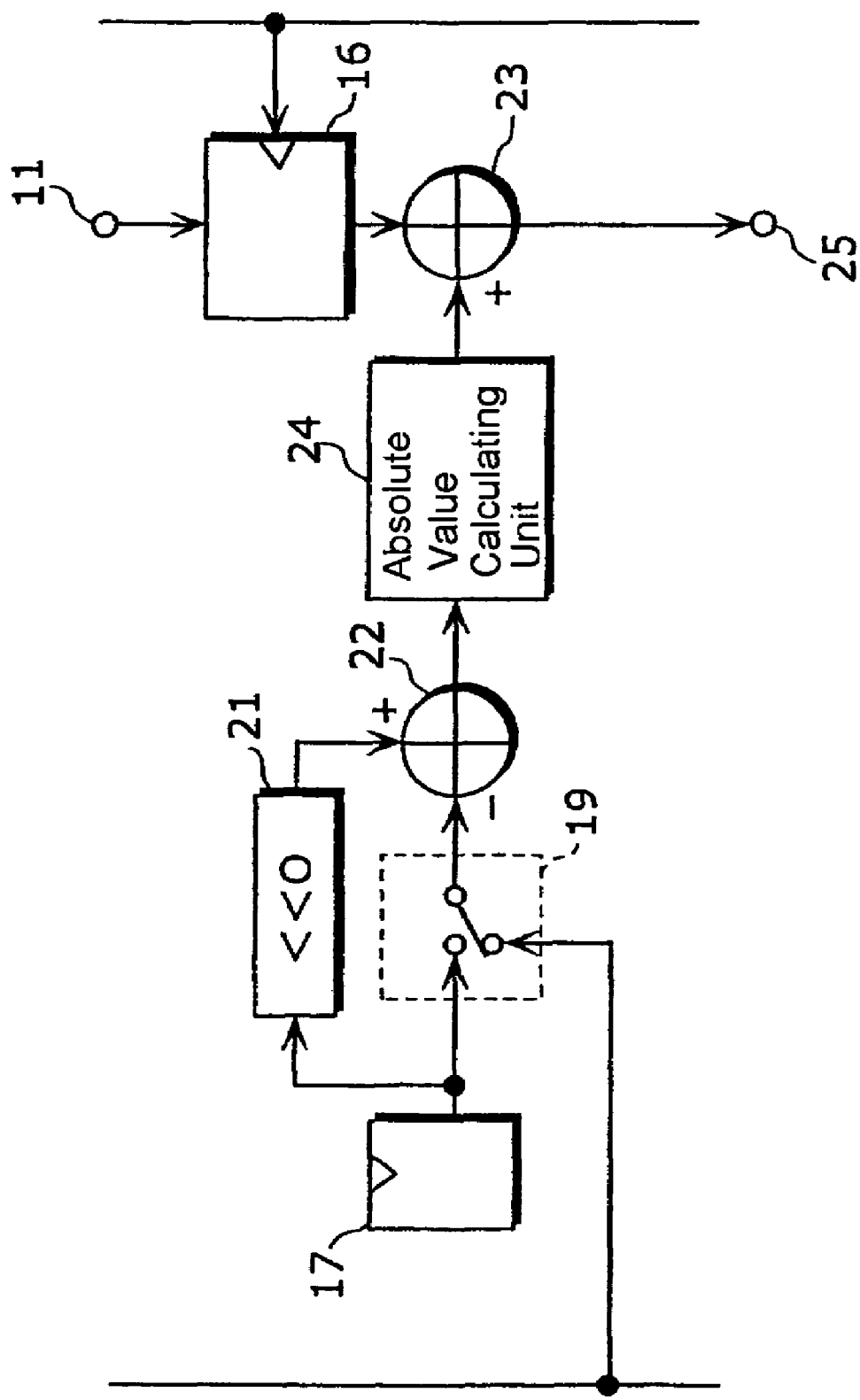
FIG. 4B is a diagram showing a simplification of the configuration shown in FIG. 4A.

FIG. 4A is a circuit block diagram showing a state of switching the arithmetic path by the first selector 18, the second selector 19 and the third selector 20 in the unit arithmetic circuit which constitutes a part of the SAD arithmetic circuit. FIG. 4B is a diagram showing a simplification of the configuration shown in FIG. 4A. In FIG. 4A, when the unit arithmetic circuits constitute the SAD arithmetic circuit, the first selector 18 selects picture data to be compared that is inputted from the second input terminal 12. The second selector 19 selects picture data for reference inputted from the third input terminal 13. The third selector 20 selects absolute value data outputted from the absolute value calculating unit 24, and the bit shifter 21 outputs through picture data (which does not shift bits) with 0 bit shift (described as "<<0").

Figure 5A:
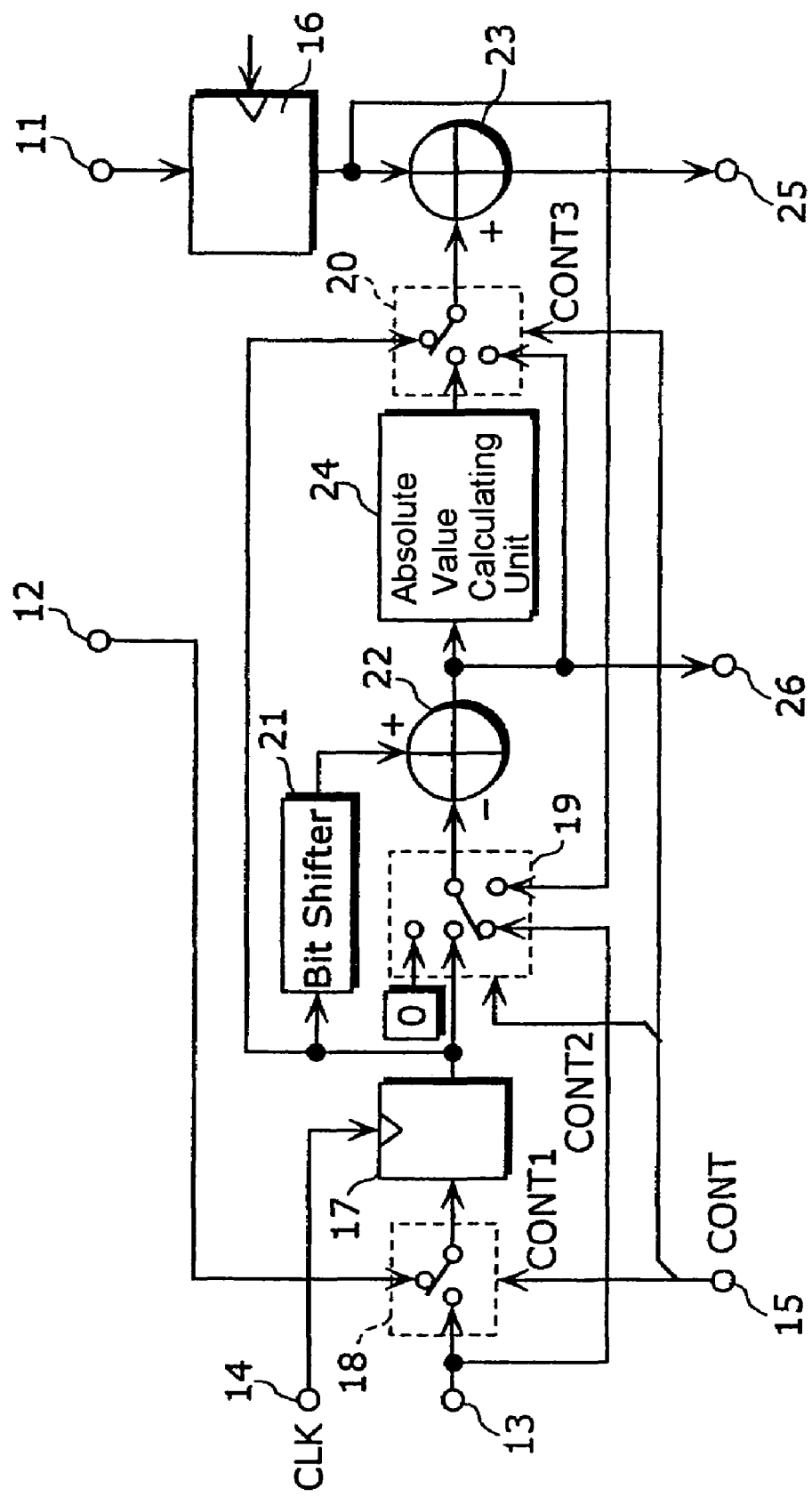
FIG. 5A is a circuit block diagram showing a state of switching an arithmetic path by the first to third selectors in the unit arithmetic circuit which constitutes a part of a digital filter.
Figure 5B:
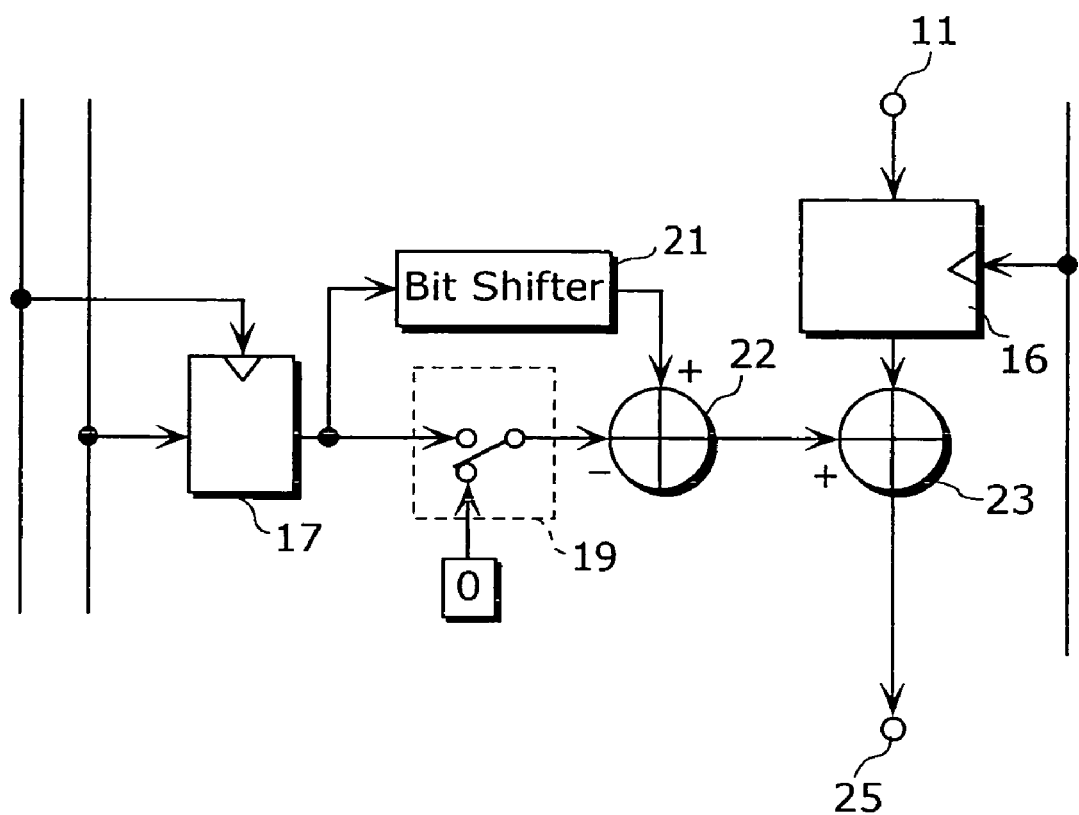
FIG. 5B is a diagram showing a simplification of the configuration shown in FIG. 5A.

FIG. 5A is a circuit block diagram showing a state of switching the arithmetic path by the first selector 28, the second selector 19 and the third selector 20 in the unit arithmetic circuit which constitutes a part of the digital filter. FIG. 5B is a diagram showing a simplification of the configuration shown in FIG. 5A. In FIG. 5A, when the unit arithmetic circuits constitute the digital filter, the first selector 18 selects picture data inputted from the third input terminal 13. The second selector 19 selects "0" which is the fixed data. The third selector 20 selects difference data outputted from the subtractor 22.

The arithmetic processing apparatus in the present embodiment is formed by arranging the unit arithmetic circuits in row and column directions, the unit arithmetic circuits reconfiguring the arithmetic circuit according to the processing mode of the targeted picture data. It executes a different arithmetic processing function, according to the processing mode, for each arithmetic processing block that some of the plurality of unit arithmetic circuits are combined.

Figure 6A:
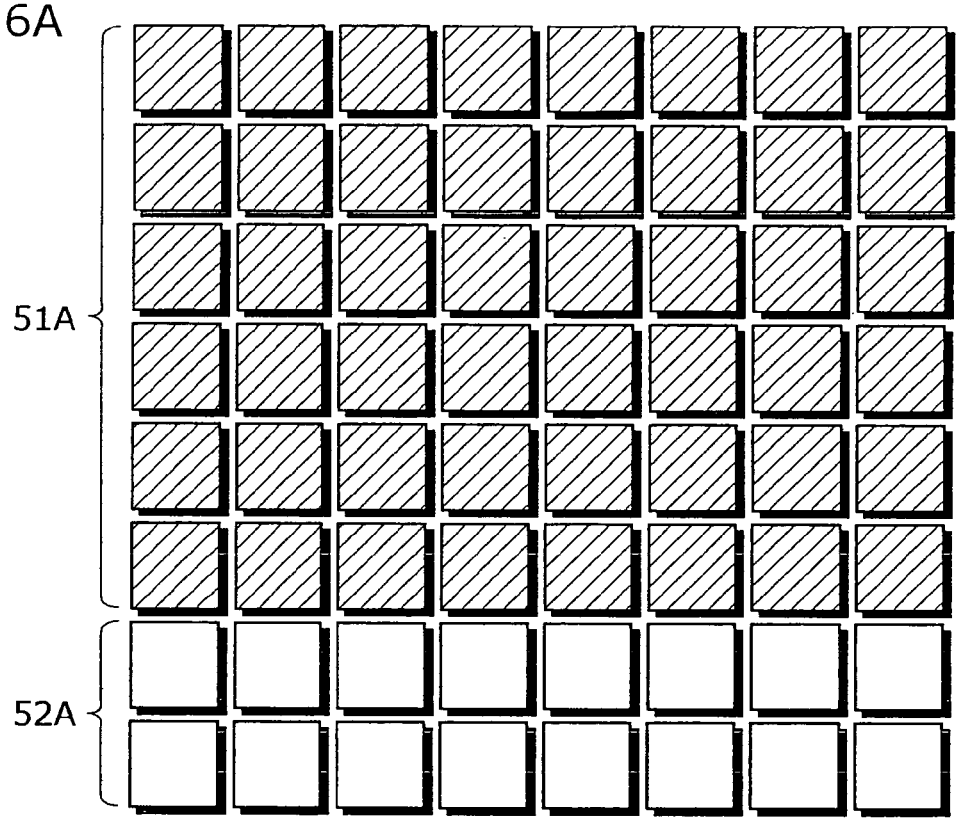
FIG. 6A is a schematic diagram showing an example of a configuration of an arithmetic processing block in JPEG processing.
Figure 6B:
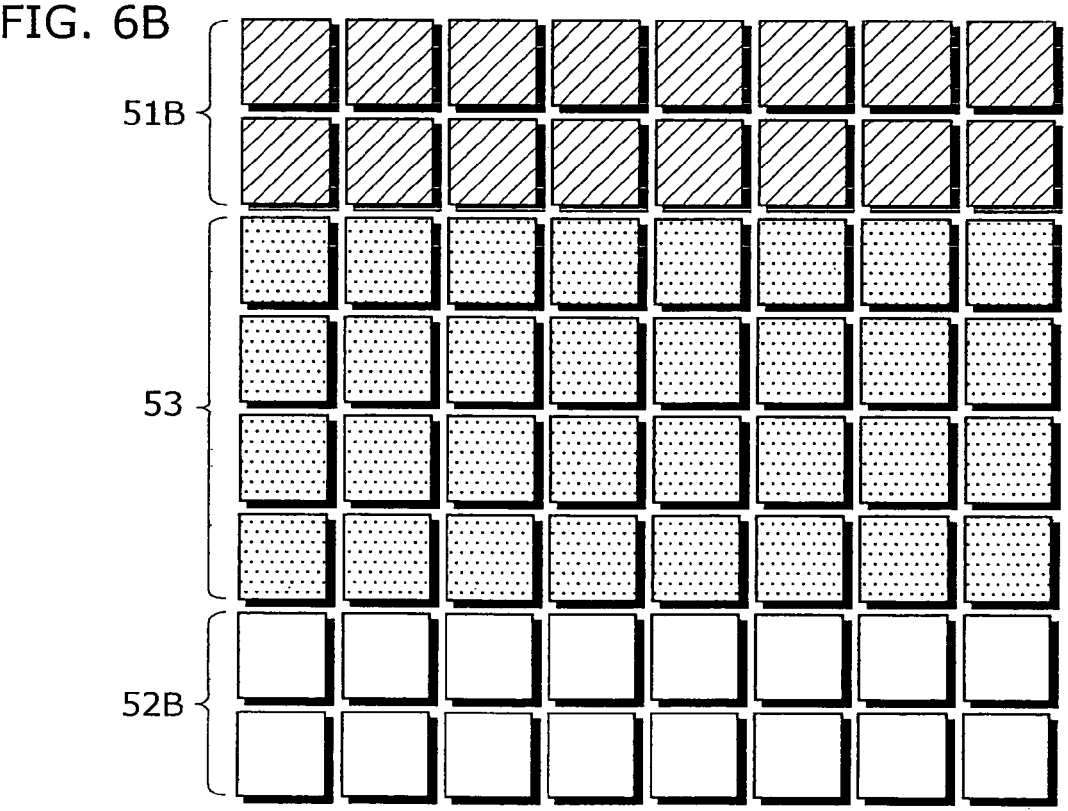
FIG. 6B is a schematic diagram showing an example of a configuration of an arithmetic processing block in MPEG processing.

FIG. 6A and FIG. 6B are schematic diagrams showing an example of a configuration of the arithmetic processing block in JPEG processing and that in MPEG processing, respectively.

In FIG. 6A, in the JPEG processing, the arithmetic processing unit is constituted of an arithmetic processing block 51A for the DCT circuit and an arithmetic processing block 52A for the digital filter. Most of the unit arithmetic circuits are assigned to the arithmetic processing block 51A for the DCT circuit. The arithmetic processing block 51A for the DCT circuit constitutes the butterfly arithmetic circuit.

First, it is explained about a configuration of the butterfly arithmetic circuit by the arithmetic processing block 51A for the DCT circuit.

Figure 7A:
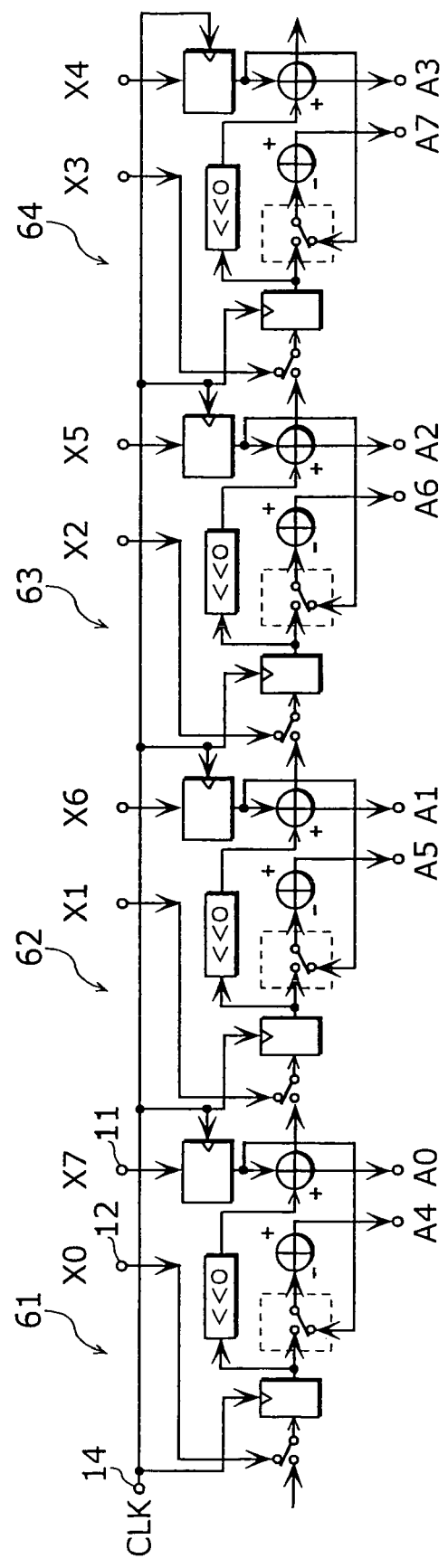
FIG. 7A is a circuit connection diagram showing an example in the case where an 8 bit butterfly arithmetic circuit constitutes four unit arithmetic circuits.

FIG. 7A is a circuit connection diagram showing an example in the case where an 8 bit butterfly arithmetic circuit is constituted of four unit arithmetic circuits. FIG. 7B is a diagram showing a simplification of the configuration shown in FIG. 7A. In FIG. 7A, eight elements $Xi(i=0, 1, \ldots, 7)$ are inputted to a first unit arithmetic circuit 61, a second unit arithmetic circuit 62, a third unit arithmetic circuit 63 and a fourth unit arithmetic circuit 64 that are reconfigured as shown in FIG. 3B and eight elements $Ai(i=0, 1, \ldots, 7)$ that constitute an intermediate vector are outputted, the eight elements Xi constituting an input vector from a distribution arithmetic circuit (not shown in the drawings) that forms a part of the DCT circuit using the DA method.

As is clear from FIG. 7A and FIG. 7B, a butterfly arithmetic equation of the intermediate vector for the input vector is described as follows:

$A0=X0+X7, A4=X0-X7$ $A1=X1+X6, A5=X1-X6$ $A2=X2+X5, A6=X2-X5$ $A3=X3+X4, A7=X3-X4$

Here, while it is not explained in detail in the present embodiment, eight elements which constitute a part of a one-dimensional DCT result are calculated by multiplying 8×8 discrete cosine matrix and the intermediate vector constituted of the eight elements $Ai(i=0, 1, \ldots, 7)$.

Next, it is explained about a configuration of the digital filter by the arithmetic processing block 52 for the digital filter shown in FIG. 6A.

Figure 8:
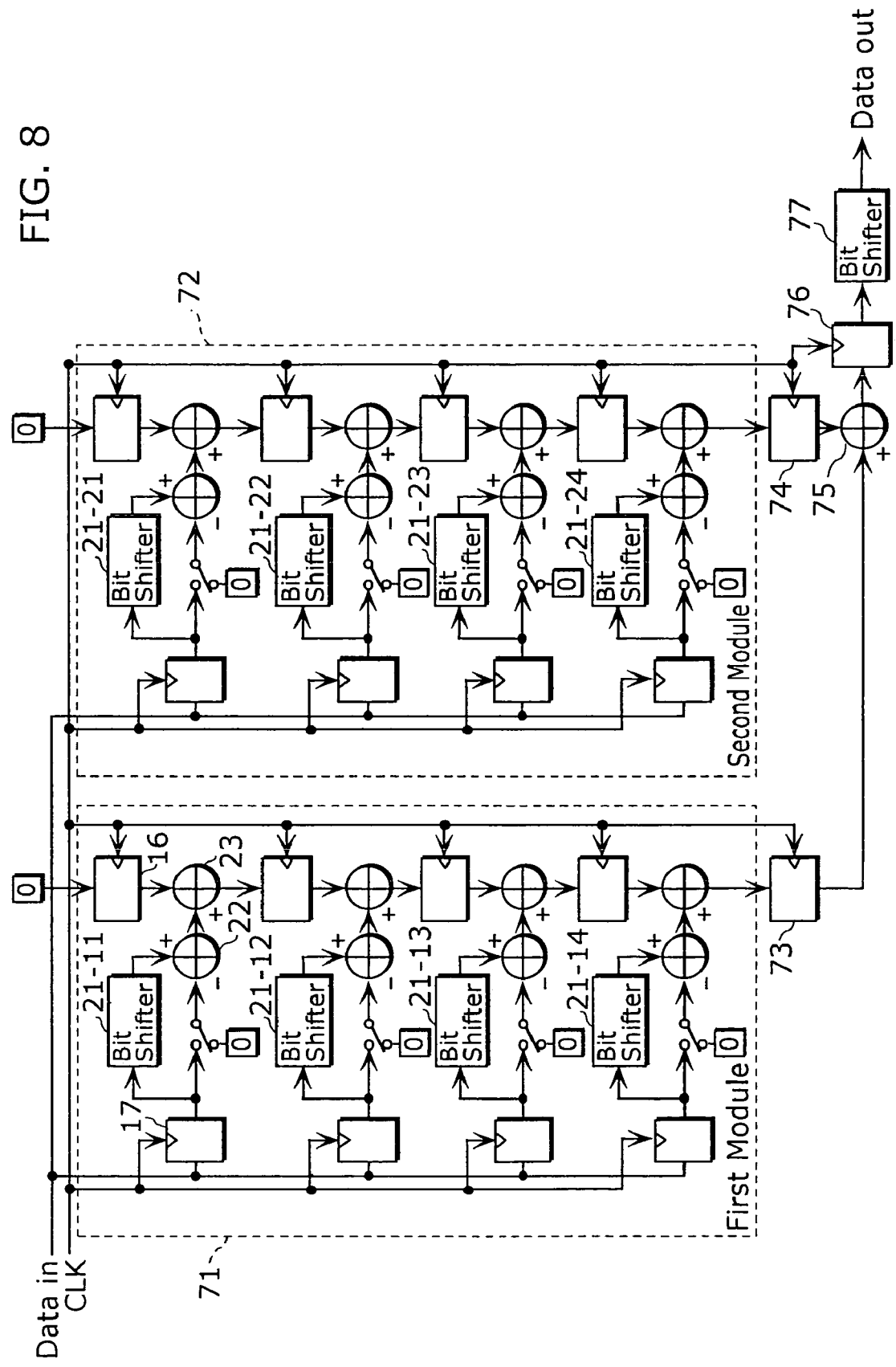
FIG. 8 is a circuit connection diagram showing an example in the case where a 4-tap digital filter is constituted of a first module made with four unit arithmetic circuits and a second module made with four unit arithmetic circuits.

FIG. 8 is a circuit connection diagram showing an example in the case where the digital filter having 4 taps is made up with a first module 71 which includes four unit arithmetic circuits and a second module 72 which includes four unit arithmetic circuits. The first module 71 and the second module 72 are formed having a same configuration by commonly connecting the third input terminal to which picture data (Data in) is inputted, and connecting, in a raw direction, only four unit arithmetic circuits corresponding to a number of taps by connecting, in the raw direction, the first output terminal of a unit arithmetic circuit to the first input terminal of the next unit arithmetic circuit. Each unit arithmetic circuit is reconfigured as shown in FIG. 5B.

Figure 9:
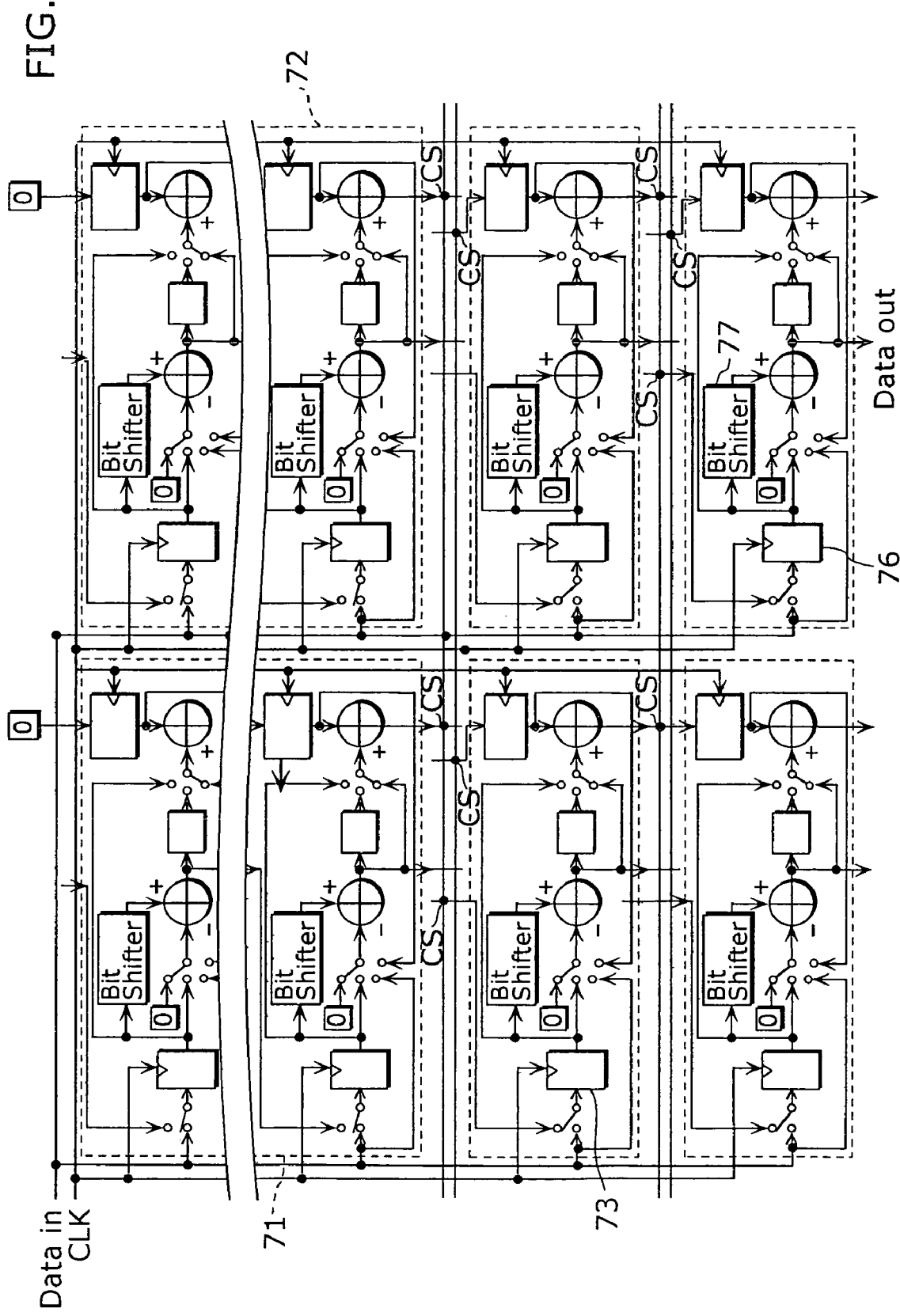
FIG. 9 is a diagram showing the connection relationship and the configuration shown in FIG. 8 in detail.

The first module 71 and the second module 72 are arranged in parallel. Each output data from each module arranged in parallel is added by an adder 75 via a first register 73 and a second register 74 in the other unit arithmetic circuit. A digital filtering is performed further on the added picture data via a second register 76 bit shifter in the other unit arithmetic circuit and the processed picture data (Data out) is outputted. FIG. 9 is a diagram showing a connection relationship and a configuration shown in FIG. 8 in detail. Note that, in FIG. 9, CS indicates a crossbar switch which connects external wirings of the unit arithmetic circuits to each other.

The digital filter having 4 taps shown in FIG. 8 and FIG. 9 has a configuration, in order to multiply the input picture data by a filter coefficient of n-th power of 2 (n is an integer), of shifting left (side of upper bit) when a sign of n is positive and shifting right when a sign of n is negative (side of lower bit) as many as a number of bits of an absolute value of n, and of sequentially adding in synchronization with the clock signal.

Next, it is explained about a performance of the digital filter using a specific example.

Figure 10:
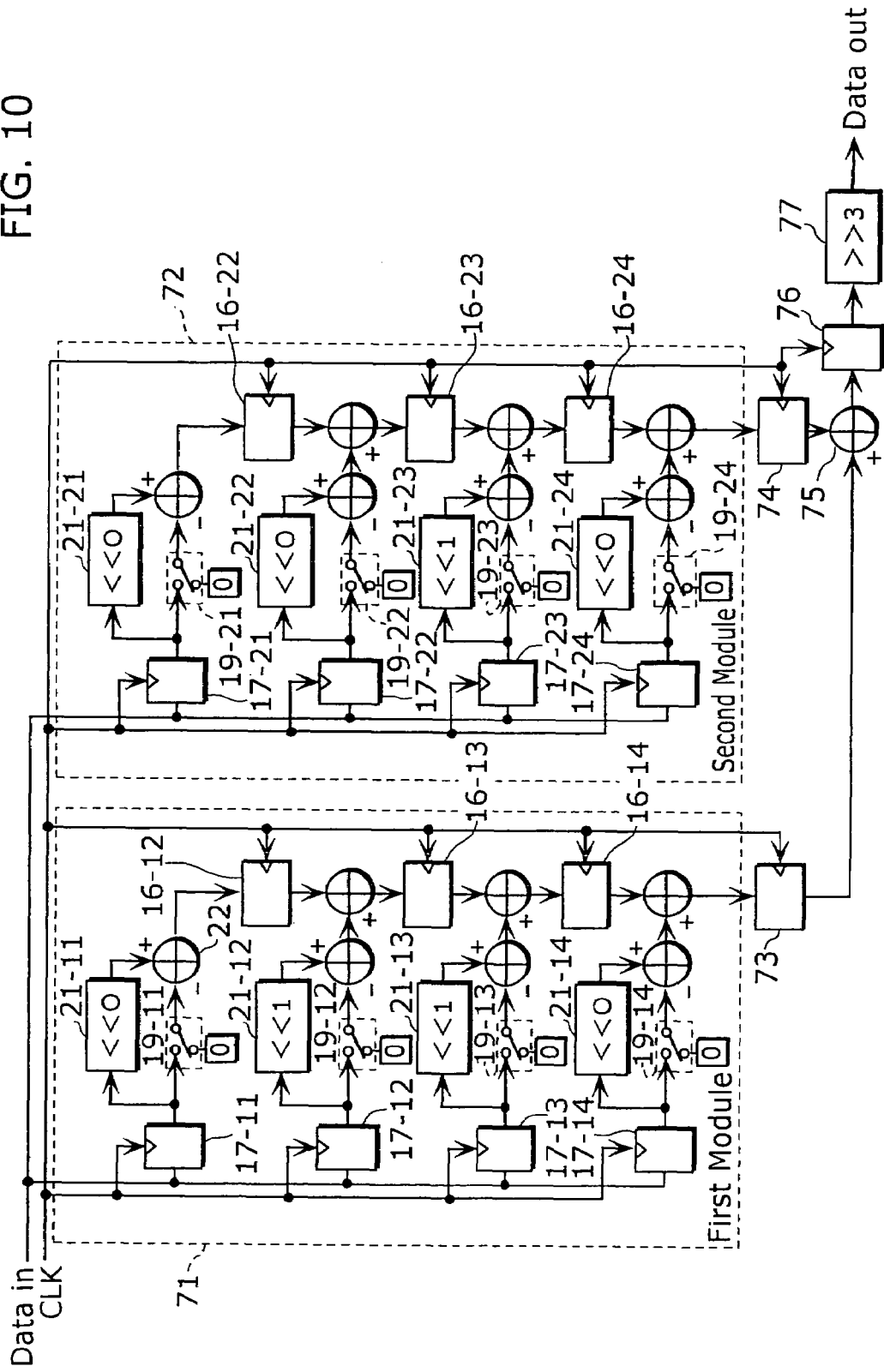
FIG. 10 is a circuit connection diagram showing a configuration of the digital filter which multiplies adjacent four pixels filter respectively by coefficients of $1/8$, $1/4(=2/8)$, $1/2(=4/8)$ and $1/8$ and adds the four pixels.

FIG. 10 is a circuit connection diagram showing a configuration of the digital filter which multiplies adjacent four pixels respectively by filter coefficients of ⅛, ¼ (=²⁄₈), ½ (=⁴⁄₈) and ⅛ and adds the four pixels. In FIG. 10, "0" is set to bit shifters 21-11, 21-12, 21-14, 21-21, 21-22, and 21-24 where become a through condition, and picture data from the second registers 17-11, 17-12, 17-14, 17-21, 17-22, 17-24 are multiplied by "$1(=2^0)$" as a coefficient.

Further, "+1" is set to the bit shifters 21-13 and 21-23 and 1 bit shift (described as "<<1") is performed towards the upper bit and the picture data from the second registers 17-13 and 17-23 is multiplied by "$2(=2^1)$" as a coefficient.

In addition, the second selectors 21-21 and 21-24 in the second module 72 switch a connection to respectively select picture data from the second registers 17-21 and 17-24. Further, "−3" is set to the bit shifter 77; 3 bits shift towards the lower bit (described as ">>3") is performed; and the picture data from the adder 76 is multiplied by "$⅛(=2^{-3})$" as a coefficient.

FIG. 11 is a diagram showing a change of synchronizing the output data of each register (Reg) and the output data (Data out) of the bit shifter 77 with clock signals CLK. Note that in FIG. 11, CLK0, CLK1, CLK2, ..., and CLK5 indicate rising points of the clock signals CLK. Making CLK0 as a basis, CLK1 indicates a rising point of the CLK after one clock period; CLK2 indicates a rising point of the CLK after 2 clock periods; and CLK5 indicates a rising point of the CLK after 5 clock periods. Additionally, Reg16-12, for instance, indicates the output data from the first register 16-12. Also, d0, d1, ..., and d4 indicate pixel data.

As shown in FIG. 11, the final output data Data out is d0/8+d1/4+d2/2+d3/8 at the point of CLK4 and d1/8+d2/4+d3/2+d4/8 at the point of CLK5. The adjacent four pixels are multiplied respectively by the filter coefficients of ⅛, ¼, ½ and ⅛. The multiplied adjacent four pixels are then added to one another thus the digital filtering is performed.

Next, with reference to FIG. 6B, it is explained about a configuration of the arithmetic processing block in the MPEG processing.

In FIG. 6B, in the MPEG processing, the arithmetic processing apparatus is made up with an arithmetic processing block 51B for the DCT circuit, an arithmetic processing block 53 for the ME circuit, and an arithmetic processing block 52B for the digital filter. Most of the unit arithmetic circuits are assigned to the arithmetic processing block 53 for the ME circuit.

Note that a butterfly arithmetic circuit constituted of the arithmetic processing block 51B for the DCT circuit only differs in a number of the unit arithmetic circuits that are assigned according to the processing capability and its function and configuration are the same as those of the butterfly circuit constituted of the arithmetic processing 51B for the DCT circuit in the JPEG processing. Therefore, the explanations about those are omitted in here. In addition, the arithmetic processing block 52B for the digital filter has same configuration and function as those of the arithmetic processing block 52A for the digital filter in the JPEG processing. Therefore, the explanations about those are also omitted.

The arithmetic processing block 53 for the ME circuit constitutes the SAD arithmetic circuit. Hereafter, it is explained about the SAD arithmetic circuit by the arithmetic processing block 53 for the ME circuit.

Figure 12:
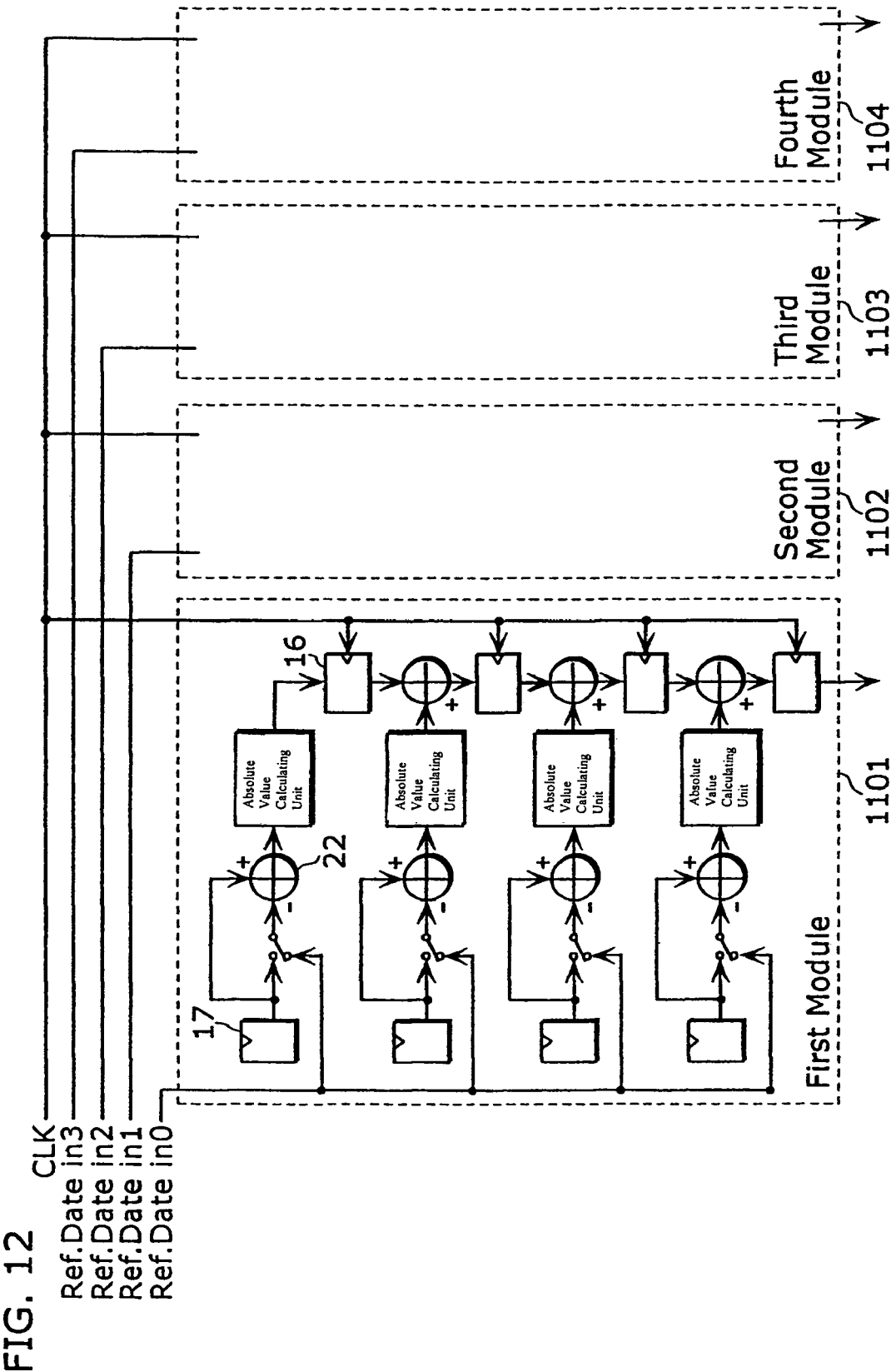
FIG. 12 is a circuit connection diagram showing an example in the case where an ME base unit made with 4×4 pixels is formed by arranging in parallel, in a row direction, a first module made up with four unit arithmetic circuits connected in a column direction, a second module, a third module and a forth module that have the same configuration as that of the first module.

FIG. 12 is a circuit connection diagram showing an example in the case where the ME base unit of 4 pixels×4 lines is formed by arranging in parallel, in a column direction, the first module 1101, the second module 1102, the third module 1103 and the fourth module 1104, the first module 1101 having a configuration in which four unit arithmetic circuits are connected to each other in a row direction. Here in FIG. 12, the internal configurations of the second module 1102, the third module 1103 and the fourth module 1104 are same as that of the first module 1101 so that those are not shown in the diagram.

In FIG. 12, each of the first module 1101, the second module 1102, the third module 1103 and the fourth module 1104 is formed by being commonly connected to the third input terminals to which pixel data for reference constituting respectively picture data for reference Ref. Data in0, Ref. Data in1, Ref. Data in2 and Ref. Data in3 are readout and inputted from a picture memory for reference (not shown in the diagram) as shifting the position to a vertical direction, by connecting the first output terminal of a unit arithmetic circuit to the first input terminal of a unit arithmetic circuit that is arranged next in a column direction, and by connecting four unit arithmetic circuits in the column direction. Each unit arithmetic circuit is reconfigured as shown in FIG. 4B. Note that while it is not shown in the diagram, the second register of each module holds pixel data to be compared which is inputted from the second input terminal.

Figure 13:
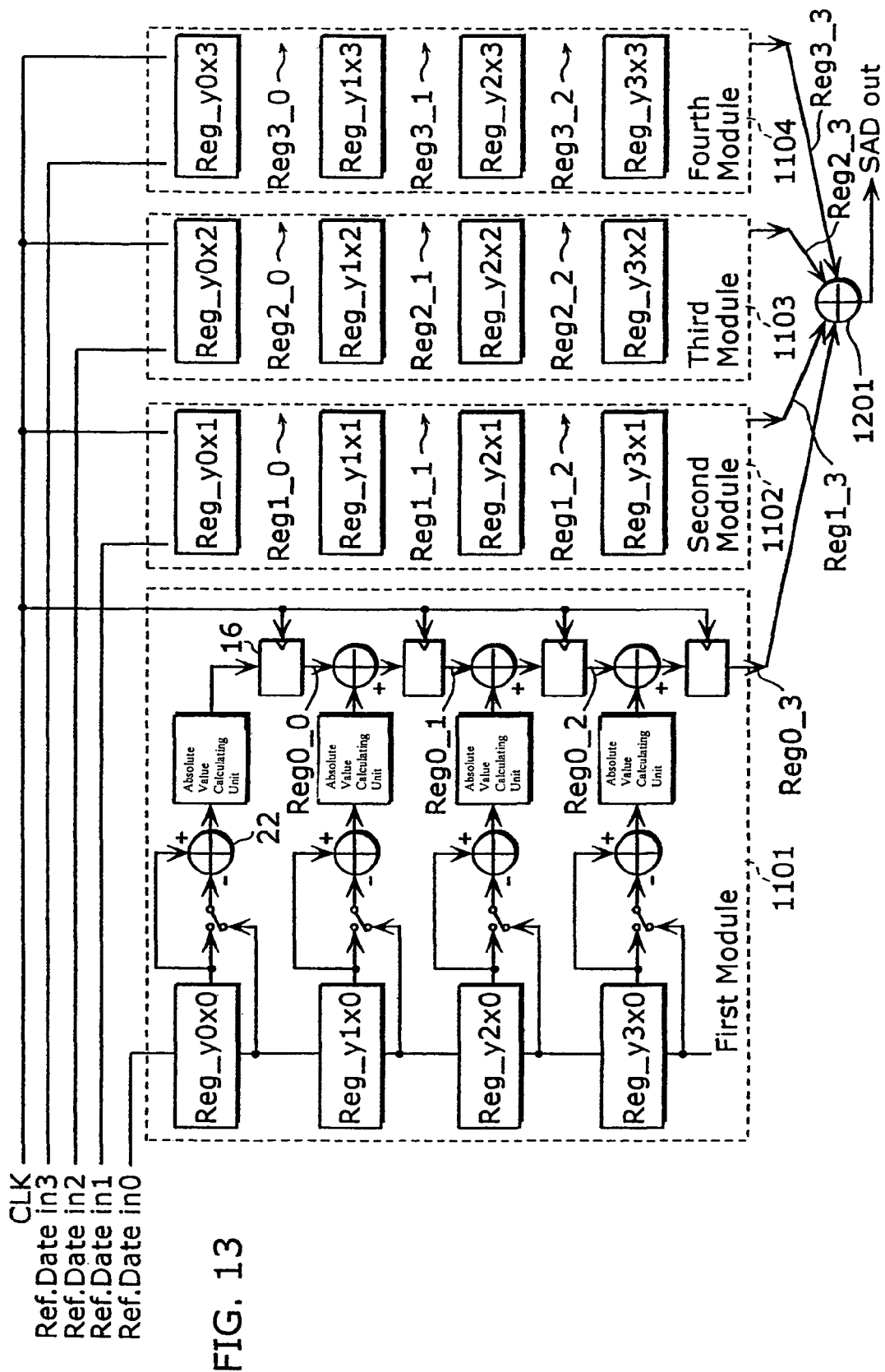
FIG. 13 is a diagram for explaining a circuit performance shown in FIG. 12.

Next, with reference to FIG. 13, it is explained about a circuit performance in FIG. 12.

In FIG. 13, into the second registers of the first module 1101, Reg_y0x0 which is pixel data to be compared in the first row and the first column, Reg_y1x0 which is pixel data to be compared in the second row and the first column, Reg_y2x0 which is pixel data to be compared in the third row and the first column, Reg_y3x0 which is pixel data to be compared in the fourth row and the first column are respectively stored. Also, in the first module 1101, Reg0_0, Reg0_1, Reg0_2 and Reg0_3 indicate output data from each first register.

Similarly, into the second registers of the second module 1102, Reg_y0x1 which is pixel data to be compared in the first row and the second column, Reg_y1x1 which is pixel data to be compared in the second row and the second column, Reg_y2x1 which is pixel data to be compared in the third row and the second column, and Reg_y3x1 which is pixel data to be compared in the fourth row and the second column are respectively stored. Also, in the second module 1102, Reg1_0, Reg1_1, Reg1_2 and Reg1_3 indicate output data from each first register (not shown in the diagram).

Similarly, into the second registers of the third module 1103, Reg_y0x2 which is pixel data to be compared in the first row and the third column, Reg_y1x2 which is pixel data to be compared in the second row and the third column, Reg_y2x2 which is pixel data to be compared in the third row and the third column, Reg_y3x2 which is pixel data to be compared in the fourth row and the third column are respectively stored. Also, in the third module 1103, Reg2_0, Reg2_1, Reg2_2, and Reg2_3 indicate output data from each first register (not shown in the diagram).

Similarly, into the second registers of the fourth module 1104, Reg_y0x3 which is pixel data to be compared in the first row and the fourth column, Reg_y1x3 which is pixel data to be compared in the second row and the fourth column, Reg_y2x3 which is pixel data to be compared in the third row and the fourth column, and Reg_y3x3 which is pixel data to be compared in the fourth row and the fourth column are respectively stored. Also, in the fourth module 1104, Reg3_0, Reg3_1, Reg3_2 and Reg3_3 show output data from each first register (not shown in the diagram).

The Reg0_3 which is absolute difference sum data in the first row and 4 lines outputted from the first module 1101, the Reg1_3 which is absolute difference sum data in the second row and 4 lines outputted from the second module 1102, the Reg2_3 which is absolute difference sum data in the third row and 4 lines outputted from the third module 1103, and the Reg3_3 which is absolute difference sum data in the fourth row and 4 lines outputted from the fourth module 1104 are inputted into an adder 1201 and a sum of the absolute difference in 4 pixels×4 lines (SAD out) is calculated. It indicates that the smaller an image comparison evaluation value which is the sum of the absolute differences, the more similar the pixel to be compared with the pixel for reference.

Figure 14:
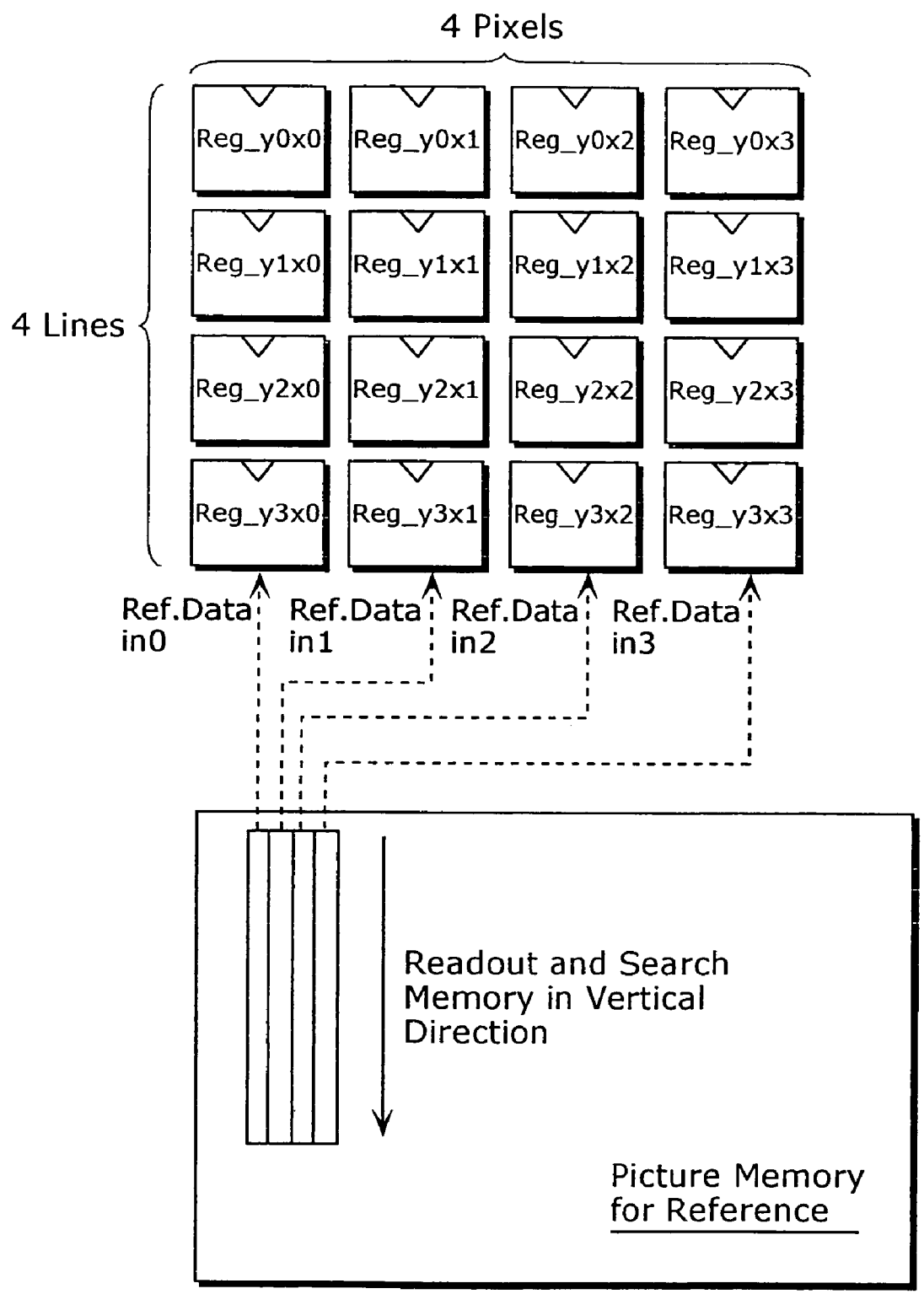
FIG. 14 is a schematic diagram which indicates an arrangement of pixels to be compared of 4 pixels×4 lines in a register as an example and shows a state of reading and searching, from a picture for reference memory, pixel data for reference in a range desired to be searched while shifting a position in a row direction.

FIG. 14 is a schematic diagram which shows an arrangement of pixels to be compared in 4 pixels×4 lines using a register as an example and shows a state of performing a search by reading out pixel data for reference in a range desired to be searched as shifting the position in a vertical direction.

FIG. 15A, similar to FIG. 11, is a diagram showing changes of output data Reg0_0, Reg0_1, Reg0_2, and Reg0_3 of each first register in the first module 1101 in synchronization with clock signals CLK. In FIG. 15A, the symbol SADabc in output data of each first register is indicated as follows using "a" as a row (line) number (position in a vertical direction), "b" as a column (module) number (position in a horizontal direction), "c" as a clock signal rising point of the absolute difference value operation, pixel data for reference as Ref_yaxb:

SAD000=(Reg_y0x0)−(Ref_y0x0)

SAD101=(Reg_y1x0)−(Ref_y1x0)

SAD202=(Reg_y2x0)−(Ref_y2x0)

SAD303=(Reg_y3x0)−(Ref_y3x0)

**************************************

SAD001=(Reg_y0x0)−(Ref_y0x0)

SAD102=(Reg_y1x0)−(Ref_y2x0)

SAD203=(Reg_y2x0)−(Ref_y3x0)

SAD304=(Reg_y3x0)−(Ref_y4x0)

**************************************

SAD002=(Reg_y0x0)−(Ref_y2x0)

SAD103=(Reg_y1x0)−(Ref_y3x0)

SAD204=(Reg_y2x0)−(Ref_y4x0)

**************************************

SAD003=(Reg_y0x0)−(Ref_y3x0)

SAD104=(Reg_y1x0)−(Ref_y4x0)

**************************************

SAD004=(Reg_y0x0)−(Ref_y4x0)

Furthermore, FIG. 15B is a diagram showing changes of output data Reg1_0, Reg1_1, Reg1_2 and Reg1_3 of each first register in the second module 1102 shown in FIG. 13 in synchronization with clock signal CLK. In FIG. 15B, the symbol SADabc in output data of each first register is indicated as follows as in the case of FIG. 15A:

SAD010=(Reg_y0x1)−(Ref_y0x1)

SAD111=(Reg_y1x1)−(Ref_y1x1)

SAD212=(Reg_y2x1)−(Ref_y2x1)

SAD313=(Reg_y3x1)−(Ref_y3x1)

**************************************

SAD011=(Reg_y0x1)−(Ref_y1x1)

SAD112=(Reg_y1x1)−(Ref_y2x1)

SAD213=(Reg_y2x1)−(Ref_y3x1)

SAD314=(Reg_y3x1)−(Ref_y4x1)

**************************************

SAD012=(Reg_y0x1)−(Ref_y2x1)

SAD113=(Reg_y1x1)−(Ref_y3x1)

SAD214=(Reg_y2x1)−(Ref_y4x1)

**************************************

SAD013=(Reg_y0x1)−(Ref_y3x1)

SAD114=(Reg_y1x1)−(Ref_y4x1)

**************************************

SAD014=(Reg_y0x1)−(Ref_y4x1)

In addition, FIG. 15C is a diagram showing changes of output data Reg2_0, Reg2_1, Reg2_2 and Reg2_3 of each first register in the third module 1103 shown in FIG. 13 in synchronization with clock signals CLK. In FIG. 15C, the symbol SADabc in output data of each first register is indicated as follows as in the case of FIG. 15A:

SAD020=(Reg_y0x2)−(Ref_y0x2)

SAD121=(Reg_y1x2)−(Ref_y1x2)

SAD222=(Reg_y2x2)−(Ref_y2x2)

SAD323=(Reg_y3x2)−(Ref_y3x2)

**************************************

SAD021=(Reg_y0x2)−(Ref_y1x2)

SAD122=(Reg_y1x2)−(Ref_y2x2)

SAD223=(Reg_y2x2)−(Ref_y3x2)

SAD324=(Reg_y3x2)−(Ref_y4X2)

**************************************

SAD022=(Reg_y0x2)−(Ref_y2X2)

SAD123=(Reg_y1x2)−(Ref_y3X2)

SAD224=(Reg_y2X2)−(Ref_y4X2)

**************************************

SAD023=(Reg_y0x2)−(Ref_y3x2)

SAD124=(Reg_y1x2)−(Ref_y4x2)

**************************************

SAD024=(Reg_y0x2)−(Ref_y4x2)

Also, FIG. 15D is a diagram showing changes of output data Reg3_0, Reg3_1, Reg3_2 and Reg3_3 of each first register in the fourth module 1104 shown in FIG. 13 in synchronization with clock signals CLK. In FIG. 15D, the symbol SADabc of output data of each first register is indicated as follows as in the case of FIG. 15A:

SAD030=(Reg_y0x3)−(Ref_y0x3)

SAD131=(Reg_y1x3)−(Ref_y1x3)

SAD232=(Reg_y2x3)−(Ref_y2x3)

SAD333=(Reg_y3x3)−(Ref_y3x3)

**************************************

SAD031=(Reg_y0x3)−(Ref_y1x3)

SAD132=(Reg_y1x3)−(Ref_y2x3)

SAD233=(Reg_y2x3)−(Ref_y3x3)

SAD334=(Reg_y3x3)−(Ref_y4x3)

**************************************

SAD032=(Reg_y0x3)−(Ref_y2x3)

$$SAD133 = (Reg\_y1x3) - (Ref\_y3x3)$$

$$SAD234 = (Reg\_y2x3) - (Ref\_y4x3)$$

\*\*\*\*\*\*\*\*\*\*\*\*\*\*\*\*\*\*\*\*\*\*\*\*\*\*\*\*\*\*\*\*\*\*\*\*\*\*\*\*

$$SAD033 = (Reg\_y0x3) - (Ref\_y3x3)$$

$$SAD134 = (Reg\_y1x3) - (Ref\_y4x3)$$

\*\*\*\*\*\*\*\*\*\*\*\*\*\*\*\*\*\*\*\*\*\*\*\*\*\*\*\*\*\*\*\*\*\*\*\*\*\*\*\*

$$SAD034 = (Reg\_y0x3) - (Ref\_y4x3)$$

As shown in FIG. 15A, FIG. 15B, FIG. 15C and FIG. 15D, at the rising point CLK3 of the clock signal CLK, the data Reg0_3 outputted from the first module 1101 becomes SAD303+SADSAD202+SADSAD101+SADSAD000, the data Reg1_3 outputted from the second module 1102 becomes SAD313+SADSAD212+SADSAD111+SAD-SAD010, the data Reg2_3 outputted from the third module 1103 becomes SAD323+SADSAD222+SADSAD121+SADSAD020, and the data Reg3_3 outputted from the fourth module 1104 becomes SAD333+SADSAD232+SAD-SAD131+SADSAD030. Accordingly, the sum of absolute differences SAD out outputted from the adder 1201 (FIG. 13) is:

$$(SAD303 + SAD202 + SAD101 + SAD000) +$$
$$(SAD313 + SAD212 + SAD111 + SAD010) +$$
$$(SAD323 + SAD222 + SAD121 + SAD020) +$$
$$(SAD333 + SAD232 + SAD131 + SAD030)$$

In addition, at the rising point CLK4 of the clock signal CLK, the data Reg0_3 outputted from the first module 1101 becomes SAD304+SADSAD203+SADSAD102+SAD-SAD001; the data Reg1_3 outputted from the second module 1102 becomes SAD314+SADSAD213+SADSAD112+SADSAD011; the data Reg2_3 outputted from the third module 1103 becomes SAD324+SADSAD223+SADSAD122+SADSAD021; and the data Reg3_3 outputted from the fourth module 1104 becomes SAD334+SADSAD233+SAD-SAD132+SADSAD031. Accordingly, the sum of absolute differences SAD out outputted from the adder 1201 (FIG. 13) is:

$$(SAD304 + SAD203 + SAD102 + SAD001) +$$
$$(SAD314 + SAD213 + SAD112 + SAD011) +$$
$$(SAD324 + SAD223 + SAD122 + SAD021) +$$
$$(SAD334 + SAD233 + SAD132 + SAD031)$$

Figure 16:
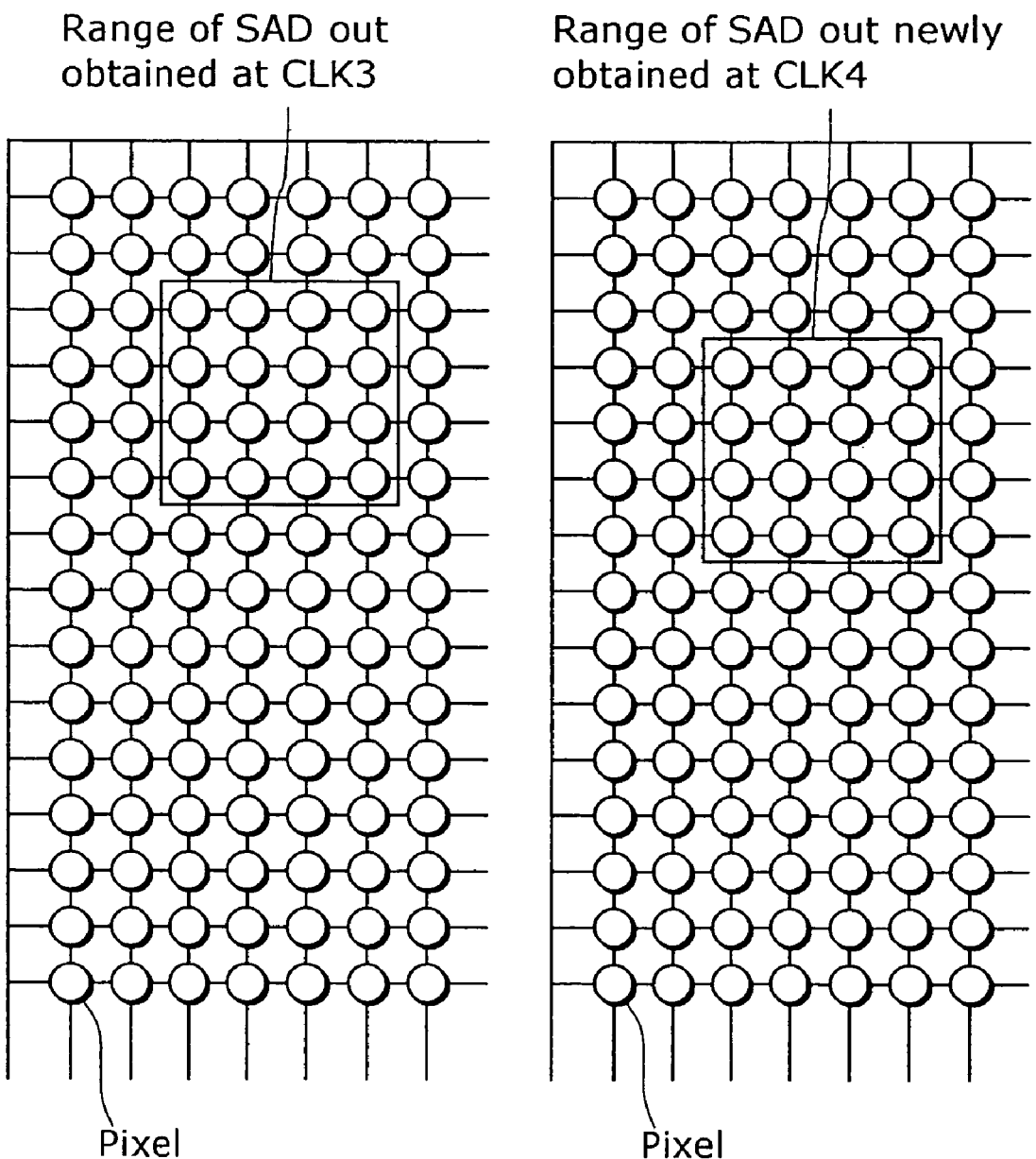
FIG. 16 is a schematic diagram showing a range of SAD out obtained at points CLK3 and CLK4 by the configuration shown in FIG. 13.

FIG. 16 is a schematic diagram showing a range of SAD out that can be calculated at the points CLK3 and CLK4 by the configuration shown in FIG. 13 or FIG. 14.

Next, it is explained about a modified example of the SAD arithmetic circuit by the arithmetic processing block 53 (FIG. 6B) for the ME circuit.

Figure 17:
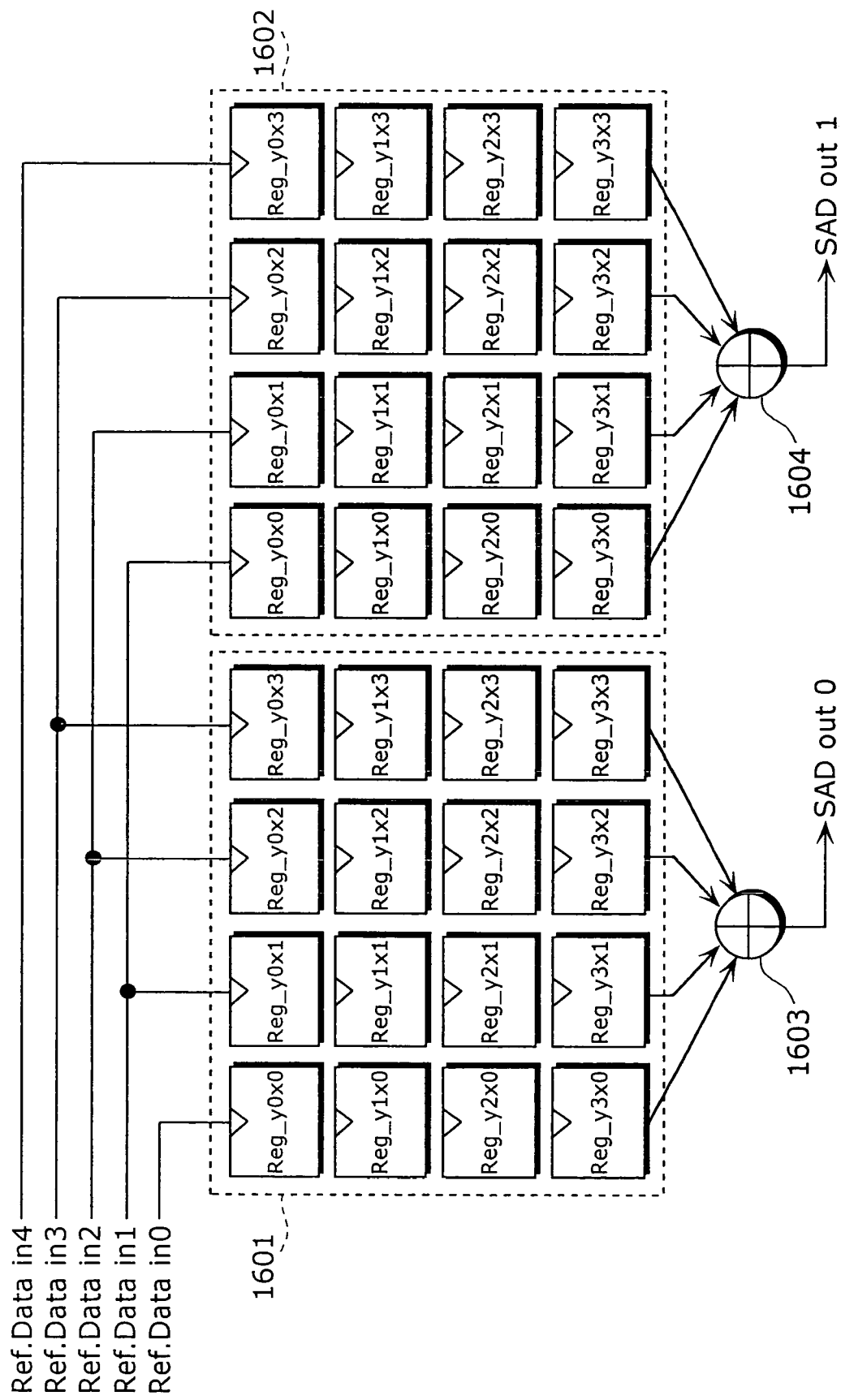
FIG. 17 is a schematic diagram showing a configuration in the case where the ME base unit of 4 pixels×4 lines shown in FIG. 13 is arranged two in parallel in a row direction and pixel data for reference is inputted to each ME base unit that is arranged in parallel, the pixel data being in a range desired to be searched while shifting the position one pixel each in a vertical direction.

FIG. 17 is a schematic diagram showing a configuration in the case where ME base units of 4 pixels×4 lines shown in FIG. 13 are arranged two in parallel in a row direction and picture data for reference shifted one pixel each in the row direction is inputted into each ME base unit arranged in parallel.

In FIG. 17, into the first ME base units 1601, the picture data for reference Ref. Data in0, Ref. Data in1, Ref. Data in 2 and Ref. Data in3 are inputted and the sum of absolute differences SAD out0 is outputted from the adder 1603. Also, into the second ME base unit 1602, the picture data for reference Ref. Data in, Ref. Data in2, Ref. Data in3 and Ref. Data in4 which are shifted one pixel each in the row direction from the first ME base unit 1601 are inputted and the sum of absolute differences SAD outs is outputted from the adder 1604.

Figure 18:
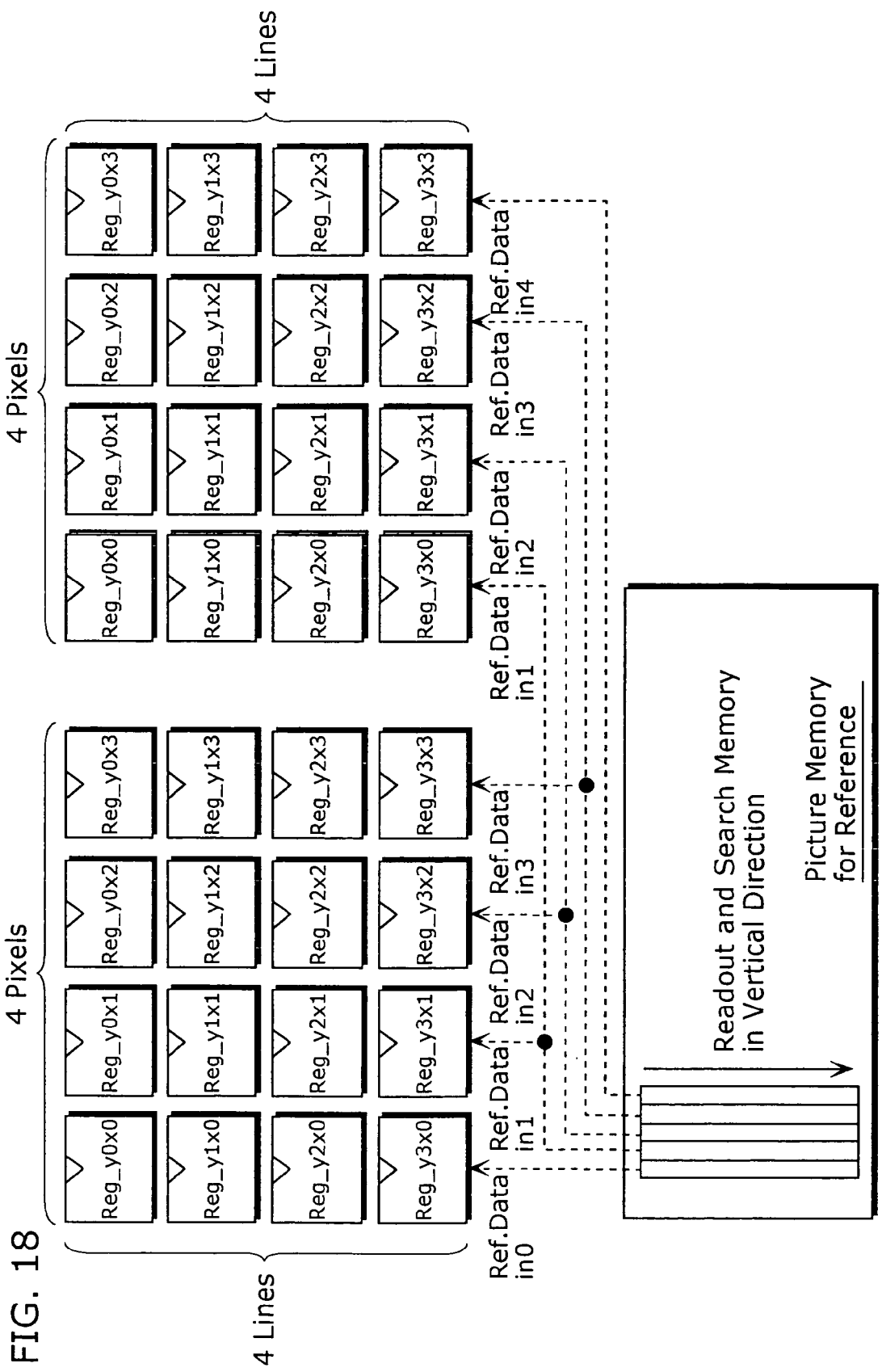
FIG. 18 is a schematic diagram showing a state of reading out, from a picture memory for reference, pixel data for reference in a range desired to be searched while shifting a position in a vertical direction and of performing the search by the configuration shown in FIG. 16.
Figure 19:
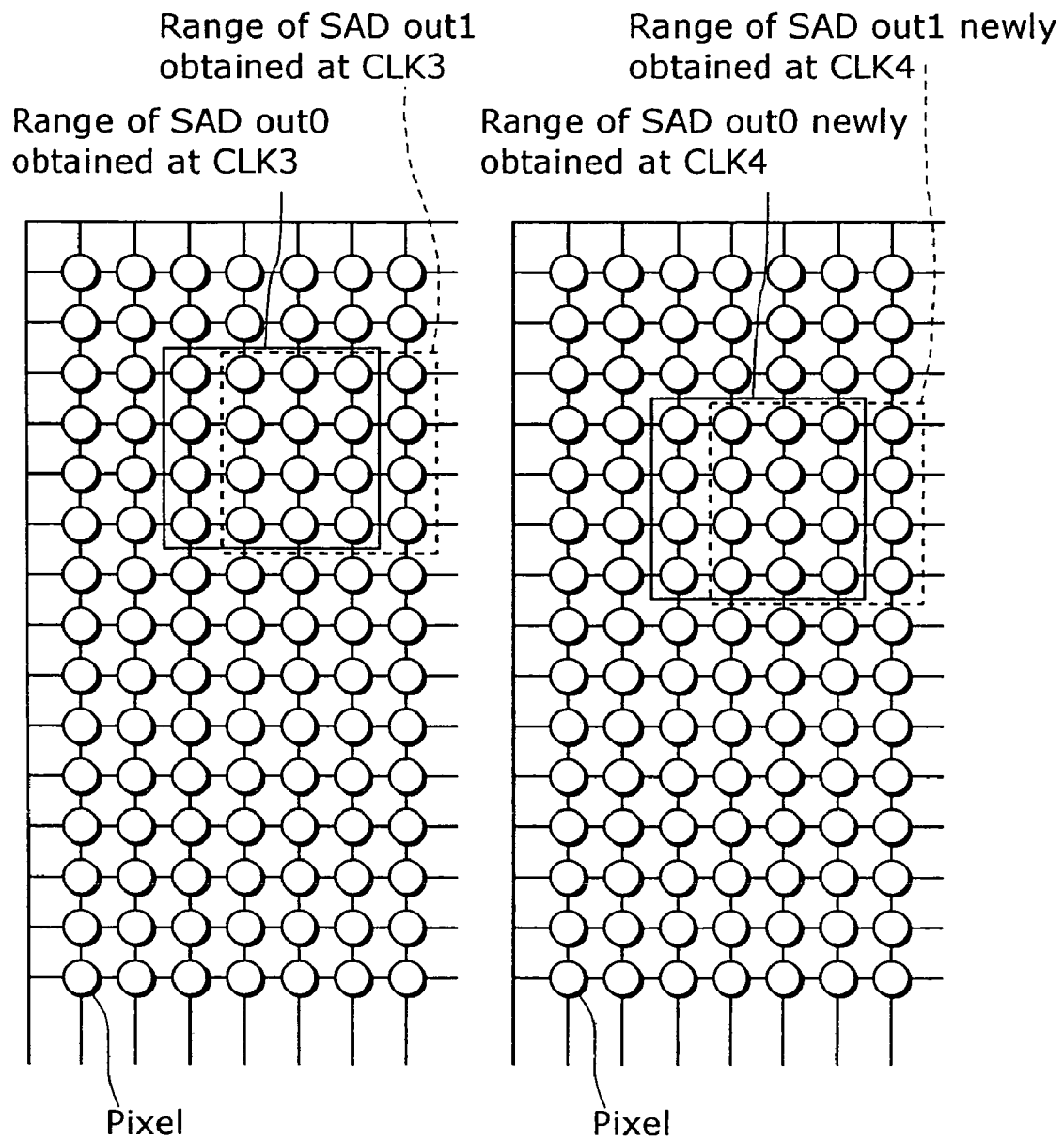
FIG. 19 is a schematic diagram showing a range of SAD out0 and SAD outs obtained at points CLK3 and CLK4 by the configuration shown in FIG. 17.

FIG. 18 is a schematic diagram showing a state, using the configuration shown in FIG. 17, of reading out, from the picture memory for reference, the pixel data for reference in a range desired to search while shifting the position in a vertical direction and of performing a search. Also, FIG. 19 is a schematic diagram showing a range of SAD out obtained at the points of CLK3 and CLK4 by the configuration shown in FIG. 17 or FIG. 18.

By configuring as described above, the wider the readout data width of the picture for reference memory is, the better the parallel processing of the search in the horizontal direction (row direction) can be performed. For instance, determining 1 pixel as 8 bits, when memory is readout by a unit of 64 bits, searches for five units by a base unit of shifting one pixel each in a horizontal direction (row direction) can be performed at the same time since 4 pixels×4 lines is the ME base unit. That is, if a center position for the five units is determined as a center in the horizontal direction, the search areas of ±2 pixels can be processed at once.

Figure 1:
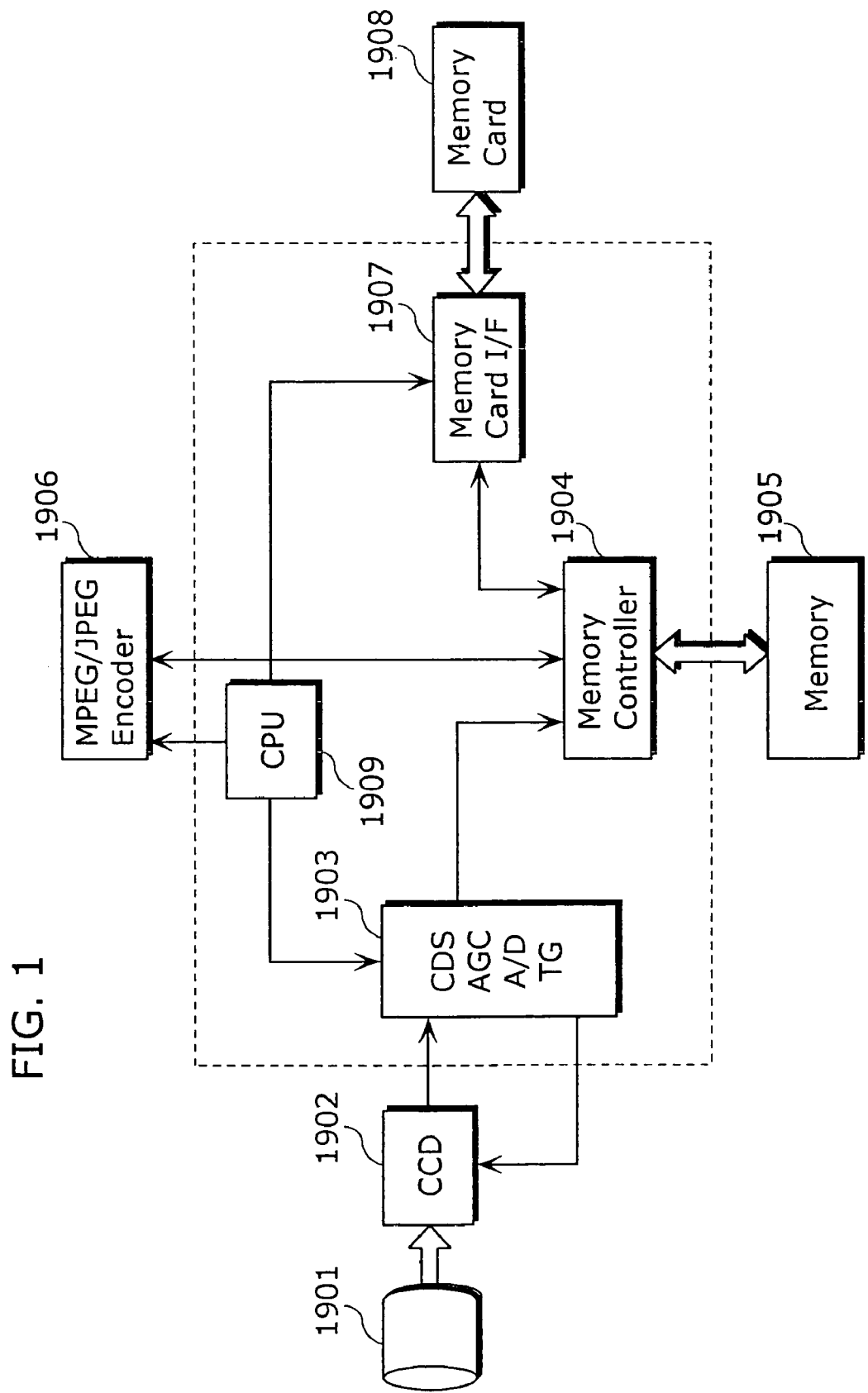
FIG. 1 is a block diagram showing an example of a configuration of a DSC having an MPEG/JPEG encoder.

Note that the arithmetic processing apparatus shown in FIG. 1 may be realized as a LSI which is an integrate circuit apparatus. This LSI may be formed as one chip or as a plurality of chips. (For instance, functional blocks other than memory may be formed on one chip.) Whereas the LSI is used in here, it is called IC, system LSI, super LSI or ultra LSI according to a difference of the integration density.

INDUSTRIAL APPLICABILITY

The arithmetic processing apparatus of the present invention can obtain necessary processing performances using a simple configuration without any wastes, minimize the circuit scale for each processing performance compared to the DSP, and be applied to an encoder LSI and the like such as DSC having a moving picture shooting function corresponding to both MPEG and JPEG.

Although the present invention has been fully described by way of examples with reference to the accompanying drawings, it is to be noted that various changes and modifications will be apparent to those skilled in the art. Therefore, unless such changes and modifications depart from the scope of the present invention, they should be constructed as being included therein.

What is claimed is:

1. An arithmetic processing apparatus that can be reconfigured in accordance with a processing mode, comprising a plurality of arranged unit arithmetic circuits,
    wherein each of said unit arithmetic circuits includes:
    at least one input terminal;
    at least one output terminal;
    a first register that holds data;
    an adder operable to add two items of data;
    a second resister that holds data;
    a bit shifter operable to shift data to one of a left and a right direction;
    a subtractor operable to calculate a difference between two items of data;

an absolute value calculating unit operable to calculate an absolute value of data; and a path setting unit operable to set a connection path according to the processing mode, the connection path connecting among said input terminal, said output terminal, said first register, said adder, said second register, said bit shifter, said subtractor, and said absolute value calculating unit, wherein combinations of unit arithmetic circuits form a plurality of arithmetic processing blocks, and each of the plurality of arithmetic processing blocks has a unique arithmetic processing function that differs depending on the processing mode, and wherein the plurality of arithmetic processing blocks include first and second arithmetic processing blocks when the processing mode is a coding mode for a still picture, the first arithmetic processing block has a partial function for a discrete cosine transform processing using a distributed arithmetic method, and the second arithmetic processing block has a digital filtering function.

2. An arithmetic processing apparatus that can be reconfigured in accordance with a processing mode, comprising a plurality of arranged unit arithmetic circuits, wherein each of said unit arithmetic circuits includes:

at least one input terminal;

at least one output terminal;

a first register that holds data;

an adder operable to add two items of data;

a second register that holds data;

a bit shifter operable to shift data to one of a left and a right direction;

a subtractor operable to calculate a difference between two items of data;

an absolute value calculating unit operable to calculate an absolute value of data; and a path setting unit operable to set a connection path according to the processing mode, the connection path connecting among said input terminal, said output terminal, said first register, said adder, said second register, said bit shifter, said subtractor, and said absolute value calculating unit, wherein combinations of unit arithmetic circuits form a plurality of arithmetic processing blocks, and each of the plurality of arithmetic processing blocks has a unique arithmetic processing function that differs depending on the processing mode, and wherein the plurality of arithmetic processing blocks include first, second and third arithmetic processing blocks when the processing mode is a coding mode for a moving picture using a correlation between moving picture frames, the first arithmetic processing block has a motion estimation function for a motion compensation interframe prediction coding, the second arithmetic processing block has a partial function for a discrete cosine transform processing using a distributed arithmetic method, and the third arithmetic processing block has a digital filtering function.

3. An arithmetic processing apparatus that can be reconfigured in accordance with a processing mode, comprising a plurality of arranged unit arithmetic circuits, wherein each of said unit arithmetic circuits includes:

at least one input terminal;

at least one output terminal;

a first register that holds data;

an adder operable to add two items of data;

a second register that holds data;

a bit shifter operable to shift data to one of a left and a right direction;

a subtractor operable to calculate a difference between two items of data;

an absolute value calculating unit operable to calculate an absolute value of data; and a path setting unit operable to set a connection path according to the processing mode, the connection path connecting among said input terminal, said output terminal, said first register, said adder, said second register, said bit shifter, said subtractor, and said absolute value calculating unit, wherein combinations of unit arithmetic circuits form a plurality of arithmetic processing blocks, and each of the plurality of arithmetic processing blocks has a unique arithmetic processing, function that differs depending on the processing mode, and wherein said at least one input terminal, includes first, second, and third input terminals, said at least one output terminal includes first and second output terminals, and said path setting unit includes:

a first selector operable to select, according to the processing mode, one of picture data inputted from the second input terminal and picture data inputted from the third input terminal;

a second selector operable to select, according to the processing mode, one of picture data outputted from said first register, picture data outputted from said second register, picture data inputted from the third input terminal and fixed data; and a third selector which i) selects, according to the processing mode, one of the picture data outputted from said second register, difference data outputted from said subtractor, and absolute value data outputted from said absolute value calculating unit and ii) outputs the selected data to a first input port of said adder, said first register holds the picture data inputted from the first input terminal in synchronization with a clock signal, said adder includes a first input port and a second input port i) adds the picture data outputted from said first register and inputted to the second input port to the picture data inputted to the first input port and ii) outputs the added data to the first output terminal, said second register holds the picture data outputted from said first selector in synchronization with the clock signal, said bit shifter shifts the picture data outputted from said second register as many as a set number of bits to one of an upper side and a lower side, said subtractor i) calculates a difference between the picture data outputted from said bit shifter and one of the picture data outputted from said second selector and the fixed data and ii) outputs the difference data to the second output terminal, and said absolute value calculating unit calculates an absolute value of the difference data.

4. An arithmetic processing apparatus that can be reconfigured in accordance with a processing mode, comprising an arranged plurality of unit arithmetic circuits, wherein each of the plurality of unit arithmetic circuits includes:

first and second input terminals;

third and fourth input terminals;
a first register operable to hold picture data inputted from the first input terminal in synchronization with a clock signal;
a first selector operable to select and output, according to the processing mode, one of picture data inputted from the second input terminal and picture data inputted from the third input terminal;
an adder having a first input port and a second input port operable to i) add picture data outputted from the first register and inputted to the first input port and picture data inputted to the second input port and ii) output to a first output terminal;
a second register operable to hold the picture data outputted from the first selector in synchronization with the clock signal;
a second selector operable to select and output, according to the processing mode, one of the picture data outputted from the first register, the picture data outputted from the second register, the picture data inputted from the third input terminal, and fixed data;
a bit shifter operable to shift the picture data outputted from the second register as many as a number of set bits to one of an upper side and a lower side;
a subtractor operable to i) calculate a difference between the picture data outputted from the bit shifter and one of the picture data outputted from the second selector and the fixed data and ii) output the difference to a second output terminal;
an absolute value calculating unit operable to calculate an absolute value of the difference data outputted from the subtractor; and
a third selector operable to i) select, according to the processing mode, one of the picture data outputted from the second register, the difference data outputted from the subtractor, and the absolute value data outputted from the absolute value calculating unit and ii) output the selected data to the second input port of the adder,
wherein combinations of unit arithmetic circuits form a plurality of arithmetic processing blocks, and
each of the plurality of arithmetic processing blocks has an arithmetic processing function and the arithmetic processing function differs depending on the processing mode, each arithmetic processing function of each of the plurality of arithmetic processing blocks being different from each other.

5. The arithmetic processing apparatus according to claim 4,
wherein the processing mode is a coding mode for a still picture, and
the plurality of arithmetic processing blocks include first and second arithmetic processing blocks,
the first arithmetic processing block has a partial function for a discrete cosine transform processing using a distributed arithmetic method, and
the second arithmetic processing block has a digital filtering function.

6. The arithmetic processing apparatus according to claim 5,
wherein the first arithmetic processing block constitutes a butterfly arithmetic circuit.

7. The arithmetic processing apparatus according to claim 5,
wherein in each of unit arithmetic circuits which forms the second arithmetic processing block,
the first selector selects picture data inputted from lower bits of the second input terminal, the second selector selects picture data inputted from upper bits of the first register,
the third selector selects the picture data outputted from the second register, and
the bit shifter outputs with zero bit shift.

8. The arithmetic processing apparatus according to claim 5,
wherein the third arithmetic processing block constitutes an arithmetic circuit, the arithmetic circuit, in synchronization with a clock signal, i) shifts input picture data, in order to multiply the input picture data by a coefficient of n-th power of 2 (n is an integer), to an upper bit side when a sign of n is positive and to a lower bit side when a sign of n is negative as many as a number of bits of the absolute value of n, and ii) sequentially adds the shifted input picture data.

9. The arithmetic processing apparatus according to claim 8,
wherein the third arithmetic processing block has first and second unit arithmetic circuits and a plurality of modules that are arranged in parallel in a row direction,
each of the plurality of modules has as many unit arithmetic circuits connected in a column direction as taps, said unit arithmetic circuits being a unit arithmetic group,
each first output terminal in the unit arithmetic circuit group is connected to a first input terminal of a unit arithmetic circuit that is arranged next in the column direction,
each first selector in the plurality of modules selects the picture data inputted from the third input terminal,
each second selector in the plurality of modules selects the fixed data,
each third selector in the plurality of modules selects the picture data outputted from the subtractor,
the third input terminals in the plurality of modules are connected to each other and the picture data is inputted into said third input terminals,
the first unit arithmetic circuit i) inputs each output data outputted from the plurality of modules that are arranged in parallel into the adder via the first and second registers and ii) outputs the added picture data, and
the second unit arithmetic circuit i) inputs the added picture data into the bit shifter via the second register and ii) outputs an output of the bit shifter as a result of the digital filtering.

10. The arithmetic processing apparatus according to claim 4,
wherein the processing mode is a coding mode for a moving picture using a correlation between moving picture frames,
the plurality of arithmetic processing blocks include first, second and third arithmetic processing blocks,
the first arithmetic processing block has a motion estimation function for a motion compensation interframe prediction coding,
the second arithmetic processing block has a partial function for a discrete cosine transform processing using a distributed arithmetic method, and
the third arithmetic processing block has a digital filtering function.

11. The arithmetic processing apparatus according to claim 10,
wherein the first arithmetic processing block constitutes an arithmetic circuit which calculates a sum of difference absolute values, and
the second arithmetic processing block constitutes a butterfly arithmetic circuit.

12. The arithmetic processing circuit according to claim 10,
wherein in each of the unit arithmetic circuits which constitute the second arithmetic processing block,
the first selector selects picture data inputted from lower bits of the second input terminal,
the second selector selects the picture data outputted from upper bits of the first register,
the third selector selects the picture data outputted from the second register, and
the bit shifter outputs with zero bit shift.

13. The arithmetic processing apparatus according to claim 10,
wherein in each of unit arithmetic circuits which constitute the first arithmetic processing block,
the first selector selects picture data to be compared that is inputted from the second input terminal,
the second selector selects picture data for reference that is inputted from the third input terminal,
the third selector selects absolute value data outputted from the absolute value calculating unit, and
the bit shifter outputs with zero bit shift.

14. The arithmetic processing apparatus according to claim 10,
wherein the first arithmetic processing block has at least a same number of the unit arithmetic circuits arranged in a row direction as a number of pixels on which a motion estimation is performed, and
picture data for reference is inputted while shifting a position in a column direction.

15. The arithmetic processing apparatus according to claim 14,
wherein a plurality of the first arithmetic processing blocks are arranged in parallel in the row direction, and
the picture data for reference which is shifted by one pixel each in the column direction is inputted into the plurality of first arithmetic processing blocks.

16. The arithmetic processing apparatus according to claim 14,
wherein the first arithmetic processing block has a plurality of modules that are arranged in parallel in the row direction,
each of the plurality of modules is constituted by connecting as many of said unit arithmetic circuits as a number of pixels in the column direction,
pixel data for reference which constitutes the picture data for reference is commonly inputted to the third input terminals in the plurality of modules, and
the first input terminals in the plurality of modules are connected to a first output of an adjacent unit arithmetic circuit.

17. The arithmetic processing apparatus according to claim 10, wherein the third arithmetic processing block constitutes an arithmetic circuit, the arithmetic circuit, in synchronization with a clock signal, i) shifts input picture data, in order to multiply the input picture data by a coefficient of n-th power of 2 (n is an integer), to an upper bit side when a sign of n is positive and to a lower bit side when a sign of n is negative as many as a number of bits of the absolute value of n, and ii) sequentially adds the shifted input picture data.

18. The arithmetic processing apparatus according to claim 17,
wherein the third arithmetic processing block has first and second unit arithmetic circuits and a plurality of modules that are arranged in parallel in a row direction,
each of the plurality of modules has as many unit arithmetic circuits connected in a column direction as taps, said unit arithmetic circuits being a unit arithmetic group,
each first output terminal in the unit arithmetic circuit group is connected to a first input terminal of a unit arithmetic circuit that is arranged next in the column direction,
each first selector in the plurality of modules selects the picture data inputted from the third input terminal,
each second selector in the plurality of modules selects the fixed data,
each third selector in the plurality of modules selects the picture data outputted from the second register,
the third input terminals in the plurality of modules are connected to each other and the picture data is inputted into said third input terminals,
the first unit arithmetic circuit i) inputs each output data outputted from the plurality of modules that are arranged in parallel into the adder via the first and second registers and ii) outputs the added picture data, and
the second unit arithmetic circuit i) inputs the added picture data into the bit shifter via the second register and ii) outputs an output of the bit shifter as a result of the digital filtering.

19. The arithmetic processing apparatus according to claim 10,
wherein combinations of the unit arithmetic circuits form a plurality of arithmetic processing blocks, and
each of the plurality of arithmetic processing blocks has a unique arithmetic processing function that differs depending on the processing mode.

20. The arithmetic processing apparatus according to claim 19,
wherein the plurality of arithmetic processing blocks includes first, second and third arithmetic processing blocks when the processing mode is a coding mode for a moving picture using a correlation between moving picture frames,
the first arithmetic processing block has a motion estimation function in a motion compensation interframe prediction coding,
the second arithmetic block has a partial function for a discrete cosine transform processing using a distributed arithmetic method, and
the third arithmetic processing block has a digital filtering function.

21. A semiconductor device that can be reconfigured in accordance with a processing mode, comprising a plurality of arranged unit arithmetic circuits,
wherein each of the plurality of unit arithmetic circuits include:
at least one input terminal;
at least one output terminal;
a first register that holds data;
an adder operable to add two items of data;
a second register that holds data;
a bit shifter operable to shift data to one of a left and a right direction;
a subtractor operable to calculate a difference between two items of data;
an absolute value calculating unit operable to calculate an absolute value of data; and
a path setting unit operable to set a path according to the processing mode, the path connecting among the input terminal, the output terminal, the first register, the adder, the second register, the bit shifter, the subtractor, and the absolute value calculating unit, wherein combinations of unit arithmetic circuits form a plurality, of arithmetic processing blocks, and each of the plurality of arithmetic processing blocks has a unique arithmetic processing function that differs depending on the processing mode, and wherein the plurality of arithmetic processing, blocks includes first and second arithmetic processing blocks when the processing mode is a coding mode for a still picture, the first arithmetic processing block has a partial function for a discrete cosine transform processing using a distributed arithmetic method, and the second arithmetic processing block has a digital filtering function.

22. A semiconductor device that can be reconfigured in accordance with a processing mode, comprising a plurality of semiconductors, wherein each of said semiconductors comprises:

at least one input terminal;

at least one output terminal;

a first register that holds data;

an adder operable to add two items of data;

a second register that holds data;

a bit shifter operable to shift data to one of a left and a right direction;

a subtractor operable to calculate a difference between two items of data;

an absolute value calculating unit operable to calculate an absolute value of data; and a path setting unit operable to set a connection path according to the processing mode, the connection path connecting among said input terminal, said output terminal, said first register, said adder, said second register, said bit shifter, said subtractor, and said absolute value calculating unit, wherein combinations of said semiconductors form a plurality of arithmetic processing blocks, and each of the plurality of arithmetic processing blocks has a unique arithmetic processing function that differs depending on the processing mode, and wherein the plurality of arithmetic processing blocks includes first, second and third arithmetic processing blocks when the processing mode is a coding mode for a moving picture using a correlation between moving picture frames, the first arithmetic processing block has a motion estimation function for a motion compensation interframe prediction coding, the second arithmetic processing block has a partial function for a discrete cosine transform processing using a distributed arithmetic method, and the third arithmetic processing block has a digital filtering function.

* * * * *